(12) United States Patent
Omojola et al.

(10) Patent No.: US 10,748,130 B2
(45) Date of Patent: Aug. 18, 2020

(54) SENSOR-ENABLED ACTIVATION OF PAYMENT INSTRUMENTS

(71) Applicant: Square, Inc., San Francisco, CA (US)

(72) Inventors: Ayokunle Omojola, San Francisco, CA (US); Robert Andersen, Brooklyn, NY (US); Daniele Perito, San Francisco, CA (US); Joachim Bekmann, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 789 days.

(21) Appl. No.: 15/282,759

(22) Filed: Sep. 30, 2016

(65) Prior Publication Data

US 2018/0096340 A1 Apr. 5, 2018

(51) Int. Cl.
*G06K 5/00* (2006.01)
*G06Q 20/32* (2012.01)
(Continued)

(52) U.S. Cl.
CPC ......... *G06Q 20/3223* (2013.01); *G06Q 20/10* (2013.01); *G06Q 20/3221* (2013.01);
(Continued)

(58) Field of Classification Search
CPC ............ G06Q 20/322; G06Q 20/3221; G06Q 20/3223; G06Q 20/354; G06Q 20/355;
(Continued)

(56) References Cited

U.S. PATENT DOCUMENTS

| 2,666,655 A | 1/1954 | Wolowitz |
| 3,217,643 A | 11/1965 | Crissy et al. |

(Continued)

FOREIGN PATENT DOCUMENTS

| WO | 2007/008686 A2 | 1/2007 |
| WO | 2016/033165 A1 | 3/2016 |
| WO | 2018/063809 A1 | 4/2018 |

OTHER PUBLICATIONS

International Search Report and Written Opinion for International Application No. PCT/US2017/051468, dated Nov. 22, 2017.
(Continued)

*Primary Examiner* — Thien M Le
*Assistant Examiner* — April A Taylor
(74) *Attorney, Agent, or Firm* — Lee & Hayes, P.C.

(57) ABSTRACT

In some examples, a system and method for activating a payment instrument. The method includes leveraging an activation feature associated with a payment instrument. The representation, obtained by a sensor, of the activation feature is received by the payment processing system. The payment processing system compares the representation of the activation feature with stored activation features corresponding to a user associated with the payment instrument. If the representation matches a user-associated activation feature, the payment processing system activates the payment instrument, wherein activating further includes granting the recipient access to a predetermined amount of funds through the activated payment instrument.

20 Claims, 12 Drawing Sheets

(51) Int. Cl.
*G06Q 20/34* (2012.01)
*G07F 7/08* (2006.01)
*G06Q 20/10* (2012.01)

(52) U.S. Cl.
CPC ....... *G06Q 20/3276* (2013.01); *G06Q 20/353* (2013.01); *G06Q 20/354* (2013.01); *G06Q 20/3558* (2013.01); *G07F 7/082* (2013.01); *G07F 7/086* (2013.01); *G06Q 2220/00* (2013.01)

(58) Field of Classification Search
CPC .. G06Q 20/3552; G06Q 20/3558; G07F 7/08; G07F 7/0806; G07F 7/082
See application file for complete search history.

(56) References Cited

U.S. PATENT DOCUMENTS

| | | | |
|---|---|---|---|
| 3,601,913 | A | 8/1971 | Pollock et al. |
| 5,221,838 | A | 6/1993 | Gutman et al. |
| D358,419 | S | 5/1995 | Runyan |
| D387,802 | S | 12/1997 | Finkelstein et al. |
| D406,861 | S | 3/1999 | Leedy, Jr. |
| 5,892,900 | A | 4/1999 | Ginter et al. |
| D438,563 | S | 3/2001 | Webb et al. |
| D462,714 | S | 9/2002 | Creighton |
| 6,601,049 | B1 | 7/2003 | Cooper |
| D486,515 | S | 2/2004 | True |
| 6,694,300 | B1 | 2/2004 | Walker et al. |
| D498,788 | S | 11/2004 | Lubking |
| 7,433,499 | B2 | 10/2008 | Kim |
| 7,567,936 | B1 | 7/2009 | Peckover et al. |
| 7,593,862 | B2 | 9/2009 | Mankoff |
| 7,693,745 | B1 | 4/2010 | Pomerantz et al. |
| D620,975 | S | 8/2010 | Skelding et al. |
| D622,315 | S | 8/2010 | Skelding et al. |
| D628,236 | S | 11/2010 | Skelding et al. |
| D635,186 | S | 3/2011 | Skelding et al. |
| D643,062 | S | 8/2011 | Skelding et al. |
| D665,851 | S | 8/2012 | Davis |
| 8,577,803 | B2 | 11/2013 | Chatterjee et al. |
| 8,700,905 | B2 | 4/2014 | Guenther |
| 9,152,973 | B2 | 10/2015 | Warner et al. |
| 9,390,145 | B2 | 7/2016 | Weiss et al. |
| D767,024 | S | 9/2016 | O'Shea et al. |
| 9,741,036 | B1 | 8/2017 | Grassadonia et al. |
| 9,805,384 | B2 | 10/2017 | Chauhan |
| 9,836,736 | B1 * | 12/2017 | Neale ..................... G06K 1/128 |
| D813,302 | S | 3/2018 | Getachew et al. |
| 10,032,325 | B1 | 7/2018 | Westen et al. |
| 10,157,397 | B2 * | 12/2018 | Walz .................. H04N 1/32144 |
| 2002/0046169 | A1 | 4/2002 | Keresman, III et al. |
| 2006/0206425 | A1 | 9/2006 | Sharma |
| 2007/0022303 | A1 | 1/2007 | Awatsu et al. |
| 2008/0208688 | A1 | 8/2008 | Byerley et al. |
| 2009/0299864 | A1 | 12/2009 | Newbrough |
| 2010/0089998 | A1 | 4/2010 | Sandstrom et al. |
| 2011/0099088 | A1 | 4/2011 | Berrios et al. |
| 2011/0306368 | A1 | 12/2011 | McCarthy |
| 2012/0259768 | A1 | 10/2012 | Mukherjee |
| 2012/0278189 | A1 | 11/2012 | Goldberg et al. |
| 2012/0290449 | A1 | 11/2012 | Mullen et al. |
| 2012/0296818 | A1 | 11/2012 | Nuzzi et al. |
| 2013/0024361 | A1 | 1/2013 | Choudhuri et al. |
| 2013/0024371 | A1 | 1/2013 | Hariramani et al. |
| 2013/0166441 | A1 | 6/2013 | Kobylkin et al. |
| 2013/0254284 | A1 | 9/2013 | Dougherty et al. |
| 2013/0346314 | A1 | 12/2013 | Mogollon et al. |
| 2014/0012701 | A1 | 1/2014 | Wall et al. |
| 2014/0025461 | A1 | 1/2014 | Knowles et al. |
| 2014/0122988 | A1 | 5/2014 | Eigner et al. |
| 2014/0249904 | A1 | 9/2014 | Nelsen et al. |
| 2014/0249947 | A1 | 9/2014 | Hicks et al. |
| 2015/0134468 | A1 | 5/2015 | Dixon et al. |
| 2015/0170241 | A1 | 6/2015 | Jacobsen et al. |
| 2015/0278801 | A1 | 10/2015 | Friedlander |
| 2015/0371219 | A1 | 12/2015 | Ljujic |
| 2016/0063484 | A1 | 3/2016 | Carpenter et al. |
| 2016/0275486 | A1 | 9/2016 | Liu et al. |
| 2017/0154341 | A1 | 6/2017 | Gilbertson |
| 2017/0372415 | A1 | 12/2017 | He |
| 2018/0005231 | A1 | 1/2018 | Grassadonia et al. |
| 2018/0150823 | A1 | 5/2018 | Omojola et al. |
| 2019/0034889 | A1 | 1/2019 | Brock et al. |
| 2019/0172055 | A1 | 6/2019 | Hale et al. |

OTHER PUBLICATIONS

Notice of Allowance dated May 31, 2018, for U.S. Appl. No. 15/679,968, of Grassadonia, B., et al., filed Aug. 17, 2017.
Non Final office Action dated Jun. 15, 2018, for U.S. Appl. No. 15/721,212, of Omojola, A., et al., filed Sep. 29, 2017.
Non Final office Action dated Jun. 27, 2018, for U.S. Appl. No. 15/965,792, of Jacoby, B., et al., filed Apr. 27, 2018.
Non-Final Office Action dated Sep. 15, 2016, of U.S. Appl. No. 15/199,457, for Grassadonia, B., et al., filed Jun. 30, 2016.
Notice of Allowance dated Apr. 21, 2017, of U.S. Appl. No. 15/199,457, for Grassadonia, B., et al., filed Jun. 30, 2016.
Non-Final Office Action dated Jul. 27, 2017, for U.S. Appl. No. 14/453,551, of Brock, Z., filed Aug. 6, 2014.
Non-Final Office Action dated Sep. 20, 2017, for U.S. Appl. No. 15/679,968, of Grassadonia, B., et al., filed Aug. 17, 2017.
Non-Final Office Action dated Dec. 8, 2017, for U.S. Appl. No. 15/382,132, of Westen, P., et al., filed Dec. 16, 2016.
Notice of Allowance dated Jan. 8, 2018, for U.S. Appl. No. 15/679,968, of Grassadonia, B., et al., filed Aug. 17, 2017.
Final Office Action dated Feb. 9, 2018, for U.S. Appl. No. 14/453,551, of Brock, Z., filed Aug. 6, 2014.
Notice of Allowance dated Mar. 26, 2018, for U.S. Appl. No. 15/382,132, of Westen, P., et al., filed Dec. 16, 2016.
Ex Parte Quale Action mailed Sep. 19, 2018, for Design U.S. Appl. No. 29/586,095, of Omojola, A., et al., filed Nov. 30, 2016.
Non-Final Office Action dated Nov. 13, 2018, for U.S. Appl. No. 29/586,087, of Omojola, A., et al., filed Nov. 30, 2016.
Final Office Action dated Nov. 15, 2018, for U.S. Patent Appl. No. 15/721,212, of Omojola, A., et al., filed Sep. 29, 2017.
Non-Final Office Action dated Feb. 21, 2019, for U.S. Appl. No. 14/453,551 of Brock, Z., filed Aug. 6, 2014.
Non-Final Office Action dated Mar. 7, 2019, for U.S. Appl. No. 29/586,095, of Omojola, A., et al., filed Nov. 30, 2016.
Non-Final Office Action dated Mar. 22, 2019, for U.S. Appl. No. 16/206,834, of Omojola, A., et al., filed Nov. 30, 2018.
Examiner Requisition for Canadian Design Application No. 184337 dated Oct. 2, 2019.
Non-Final Office Action dated Nov. 27, 2019, for U.S. Appl. No. 15/721,212, of Omojola, A., et al., filed Sep. 29, 2017.
Advisory Action dated Dec. 18, 2019, for U.S. Appl. No. 14/453,551, of Brock, Z., filed Aug. 6, 2014.
Final Office Action dated Aug. 22, 2019, for Design U.S. Appl. No. 29/586,087, of Omojola, A., et al., filed Nov. 30, 2016.
Final Office Action dated Aug. 22, 2019, for Design U.S. Appl. No. 29/586,095, of Omojola, A., et al., filed Nov. 30, 2016.
Non-Final Office Action dated Aug. 23, 2019, for U.S. Appl. No. 16/206,834, of Omojola, A., et al., filed Nov. 30, 2018.
Final Office Action dated Sep. 17, 2019, for U.S. Appl. No. 14/453,551, of Brock, Z., filed Aug. 6, 2014.

* cited by examiner

SENSOR-ENABLED ACTIVATION OF PAYMENT INSTRUMENTS

TECHNICAL FIELD

Payment instruments are used in a wide variety of transactions. Examples of such payment instruments include credit cards, stored value cards, debit cards, loyalty cards, library cards, membership cards, and the like. The information displayed on a credit card is typically controlled by the bank issuing the card and displays information, such as the account number, a three or four digit authentication code, validity of the card, name of issuing bank, name of the interbank network, and the like. The payment instruments also include a hologram having embedded within security features and an integrated circuit to support Europay-Mastercard-Visa (EMV) payment functionalities. Despite the aforementioned options, the choices for what is to appear on a presentation are limited. When a new payment instrument is issued to a customer, that customer is told (usually via a sticker on the card) to activate the payment instrument by calling a phone number or by visiting a website where the customer registers the payment instrument by providing personally identifiable information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
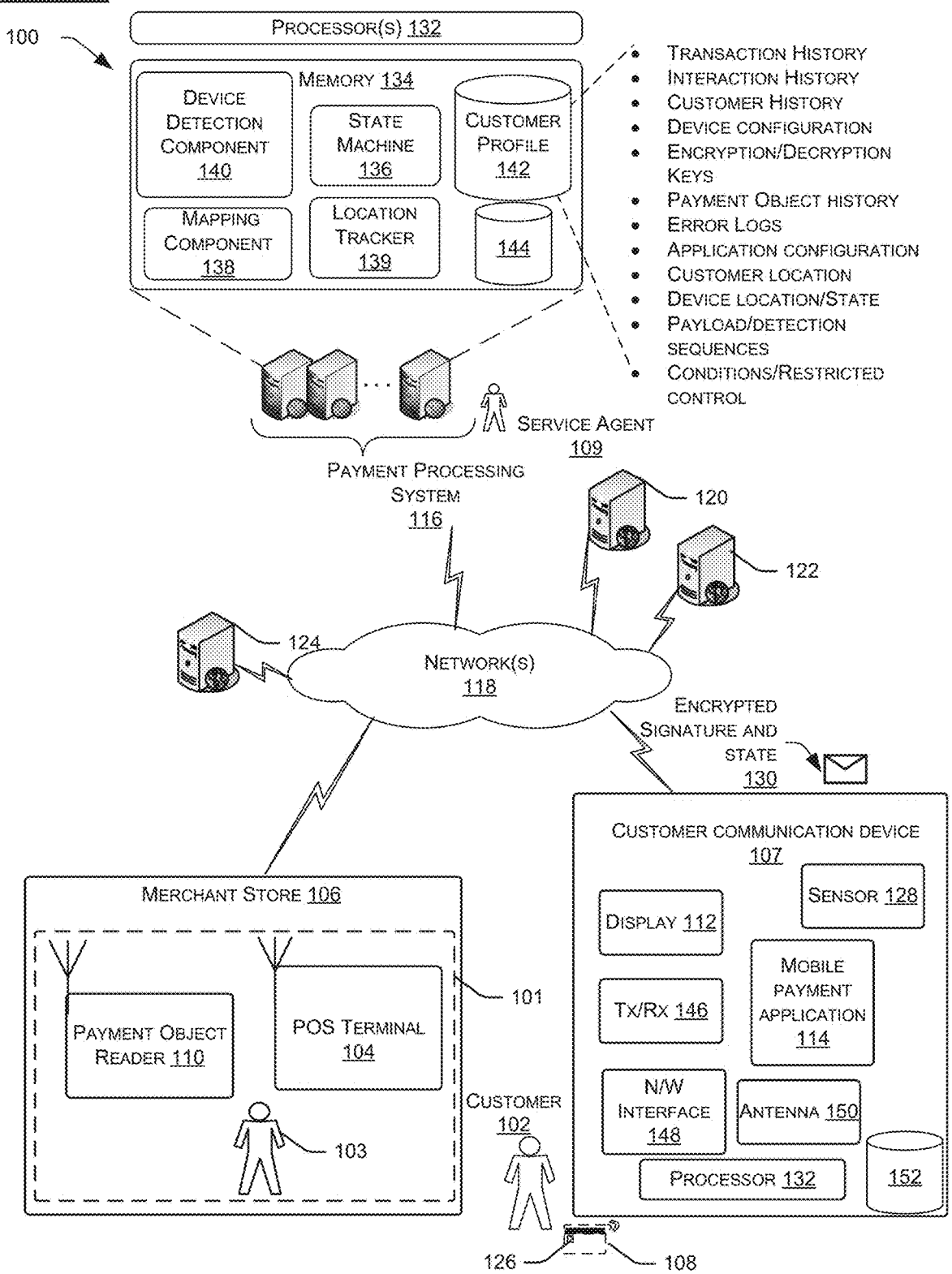
FIG. 1 is a block diagram illustrating an example environment for establishing a communication channel between a payment entity, e.g., a point-of-sale (POS) terminal, and a payment object reader, with a payment processing system to facilitate scheduling communication between the two for diagnosis and resolution of a technical failure, according to an embodiment of the present subject matter.

Embodiments for customizing and activating a payment object are described herein. The payment object can be customized with a signature, such as an image, pattern, alphanumeric text, or other such unique identifier that is embedded, printed or otherwise associated with the payment object. Furthermore, the signature can include not just the signature per se, but also the placement of the signature, for example with respect to the chip on the payment object and payment object number, etc. The payment object or payment instrument can be associated with a user of: a payment device (such as a point-of-sale terminal, a payment object reader, or a mobile communication device executing a payment application); or the payment application (such as an application for electronic money transfer, an application for managing inventory of items at an online storefront, an application for employee and customer management, a mobile register software application running on a mobile communication device to enable check out of purchases, and the like). The point-of-sale (POS) terminal, reader, and the payment applications allow merchant locations to accept payments for a product or a service; process the payment transaction for which the payment is made, e.g., by connecting to banks; and facilitate transfer of funds between accounts of payer and payee to furnish the payment transaction.

The payment instrument can be designed according to a specification corresponding to, for example, a debit card, a credit card, a smart-card (conforming to a payment instrument technical standard, such as a Europay-MasterCard-Visa ("EMV") standard), a radio frequency identification tag (i.e., near field communication enabled object), a biometric payment instrument, a virtual payment card stored on a device such as a smart phone and transmittable, for example, via near field communication (NFC), and can include personally identifiable information (PII), such as customer name, account number, and the like. The payment object can also have embedded within, or displayed on a surface, a unique pattern corresponding to or provided by the customer. The unique pattern, for example, can be a Quick Response (QR) code, a photograph, a three-dimensional image, an alphanumeric code, a text, or any other pattern.

Generally, a financial entity initiates a request for a payment instrument to be physically delivered to a user or customer. Usually, this request has to be made at a physical location of the financial entity when the user signs up for an account. When the user receives the payment instrument, the user follows set of instructions to activate the payment instrument. In the context of payment instruments, the word "activate" can mean: (a) confirming that the user in possession of the payment instrument is the intended user; (b) confirming that the payment instrument has been securely received by the intended user; (c) registering the payment instrument with the financial entity so that the intended user can use the payment instrument towards financial transactions; (d) associating the payment instrument with the identity of the user through a registration process; (e) enabling security measures and providing financial protection to the user from the time the payment instrument is activated; and/or (f) agreeing to the terms and conditions of the financial entity or any other entity issuing the payment instrument.

Traditionally, the user activates the card either by registering the payment instrument on a web application or by calling a support number. When the user activates through such mechanisms, the user provides the account number listed on the card or personally identifiable information for verification. While registering the payment instrument, the user may encounter technical issues or errors for which the user has to reach out to a service agent. The traditional means of entering the card number or other personal information adds friction to the process of registering and is not customized according to the user.

To this end, in one implementation, the user or customer associated with a financial account at a financial entity selects or provides a signature, for example a signature that is unique to the customer during the account set-up. The payment processing system that receives the customized signature converts and/or encrypts the signature into a pattern, which is capable of being imprinted, embedded or otherwise associated with the payment instrument. Once the payment instrument is delivered to the user, the user initiates a process to activate the payment instrument. For this, a mobile device, for example customer's phone and optionally, registered with the payment processing system, executes a self-guiding tool or provides a customized flow to walk the customer through the steps of registering the payment instrument. The customer can select or provide information in response to queries that are tailored to the user. For example, one of the steps can direct the customer to take an image or a portion of the image of the pattern on the payment instrument through a sensor, such as a camera, of the mobile device. The mobile device, an application executing thereon, or the payment processing system that receives the image, then decrypts and compares the image with signatures stored at the time of registration. If a stored signature matches the captured image, the payment processing system authorizes the payment instrument to be used for purchases up to a predetermined amount or an amount requested by the customer. The predetermined amount can be determined based on the credit or debit worthiness and risk ratings associated with the customer. However, if the captured image does not match a stored signature, the payment instrument is not activated, as there is an increased likelihood that the authorization attempt is fraudulent.

Since the pattern is unique to the customer, conventional cookie-cutter flows to register payment instrument are often inaccurate and cannot best validate the user's identity. Therefore, a customized flow, as disclosed herein, generates ways to add or remove validation steps based on the user profile, such as geographical location, personalization, etc. Additionally, the signature feature automates the registration process by reducing friction associated with the user having to call an agent or having to visit a website to register the payment instrument. The registration process disclosed herein is more secure by virtue of its reliance on a customized feature. While some traditional payment instruments allow for customized features, such as image of the user or name, to be displayed on the card. it will be understood that such customizations are static in the sense that the customized features cannot be used to trigger other process flows, specifically trigger auto-registration of a payment instrument as disclosed herein. Accordingly, examples described herein provide specific technical improvements over conventional methods with streamlined automation and enhanced security functionality in registering a payment instrument.

For at least the processes described above, the payment processing system also facilitates generation and display of notifications, alerts, and selectable fields for the customer on a graphical user interface associated with their communication devices. For example, the user's communication device can include within the mobile application an option to request support by establishing connection with a service agent, for example by tapping a software or hardware button on the device or within the mobile application. In another example, the selectable icon generates an interface for the customer to provide a signature. On interaction with the selectable icon, the payment processing system (hereinafter referred to as PPS) also obtains primary or secondary contextual information from the environment of the customer. The contextual information includes:

the device information, including the type of device on which the signature is provided or the payment application is running, the hardware and software settings, the communication ports open for communication like Bluetooth, Wi-Fi, the device configuration, and so on;

the software application information, including the version of application, software application configuration, other applications executing on the device; any indication of virus or malware, software settings, and so on;

the customer's information, including their phone number (which is associated with their account), any other devices associated with the user, the customer's PAN, customer's transaction history over a period of time, trends in transaction history, location, geographical location of stores, history of software downloads, and so on;

contextual information about the customer's interaction with the application, e.g. what version of the application is running, what screen is being viewed, which area of the screen is contacted as the signature is provided;

the customer's selection of call options, e.g. use an alternate phone number, call back in a certain time window offered by the server, or other such contact preferences.

The graphical user interface can also present push notifications or messages to the user; "system is ready to accept your signature. Do you want a select an image as a signature or provide your own?" with attached actions (e.g., "Yes, provide me options" to show pre-selection options for the user to select, or "Provide my own" for providing a custom signature which can be an image or text or a combination of both, and so on.

The present subject matter proposes the integration of at least the aforementioned features into a seamless and convenient mechanism for registration of a payment instrument. With relation to the problems identified previously with conventional systems and methods, the software application itself becomes an active and cooperative component of the registration process, rather than the subject of it. The description hereinafter describes the devices and applications to be related to payment technology. However, it will be understood, that the technology can be extended to any device and application that would otherwise require another entity like a service agent to help with registration of an object or product. For example, the process can easily be extended to registration and/or set-up of an electronic product, like a speaker, smart television or headphones.

In one implementation, payment object readers and/or POS terminals, mobile payment applications, hereinafter referred to as payment devices or payment entities, which implement the present techniques, include a state machine to detect state of payment device and payment application, in terms of power signal values, device or application characteristics, hardware and software configuration, and the like, and transfer such states to a PPS. In another implementation, the PPS includes the state machine to query the payment devices at various time instants, or in response to user engagement, for example with a "registration" icon. This meta-data can be saved and appended into the signature at the time of pattern creation. Later on, at the time of registration, the pattern based off the signature and the meta-data is compared with the meta-data collected from the mobile application and the mobile device. The meta-data helps provide another layer of security. In some implementations, transmitted instead of received power levels are used. In yet another implementations, other forms of signal measurements or identifiers, for example, in other frequency bands, to identify a mobile device and application for registration purposes.

The customized and automated registration technology can also be configured to operate irrespective of the kind of payment object reader, POS terminal, web applications, mobile applications, POS topologies, payment cards, computer networks, and environments. The customized and automated registration technology described herein can be configured to operate in both real-time/online and offline modes. Furthermore, even though Bluetooth or Bluetooth Low Energy has been used to describe certain embodiments, other wired or wireless protocols, such as NFC, Wi-Fi, etc., can be used with little or no modifications.

The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "substantially" or "approximately", as used herein, means approximately or actually equal (e.g., within ten percent of equal).

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS)

networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

As used herein, the term "signature" is a unique identifier that can either be provided by a customer by keying in their preferred signature on a user interface, such as touch screen or keypad or by selecting from amongst a list of options generated by a server. In another example, the server can automatically and/or randomly assign a signature to the customer at the time of account creation. The signature can be an actual signature, alphanumeric text, a unique pattern of shapes, an image, a barcode, Quick Response (QR) codes, or a radio frequency identifier (RFID) tag. The signature is referenced as being associated or printed on the payment card, however, the signature can be provided with the payment card, for example in an accompanying letter. The signature can also be embedded, such that it is hidden to naked eye. The signature once encrypted and printed or associated to the payment card can be mentioned as pattern in the specification. The signature can also be an analog of digital file that comprises a picture or a drawing that is in a JPEG or other file format.

A variety of materials can be used to craft the payment instruments. For example, the payment instruments may be crafted stock materials, such as plastics, paper, laminates, and the like. According to the stock material used to construct the payment instrument, a number of techniques can be used to associate the signature with the payment instrument. For instance, the signature may be printed on the stock material (such as by using a laser or ink jet printer). Other examples include silk screening, use of stickers or labels, embossing, painting and the like. In some cases, the stock material may have some information already included, such as the a company logo, legal notices, and the like, or this information may be placed onto the stock material at the time the signature information is placed onto the stock material.

In addition to providing the signature on the presentation instrument, some or all of the signature may be placed in portions, for example a first portion on one side and the second portion on the other side of the payment instrument. The activation then involves reading the image in two parts and in a specific order. The signature can also be printed onto other materials as well. For example, the signature may be provided on any inserts mailed with the payment instrument, the envelope or mailer, and the like.

A wide variety of techniques may be used to deliver the payment instruments to recipients after they have been created. For example, they could be attached to a card carrier and placed into a mailer along with any other inserts. This may then be mailed to the recipient. Other techniques include personal delivery, by a courier services, by in-store pick-up and the like. The payment instruments may also be produced at the purchase location.

As described herein, the payment instrument may be in an inactive state until activated by the recipient. In this way, if the payment instrument is intercepted or stolen before reaching the recipient, it may not be used. One way to activate the presentation instrument is to require certain information to be supplied by the recipient. This information may be input by the purchaser and then transmitted to the recipient, such as by e-mail, by a phone call, by a separate mailing, or the like. Instead of expecting the recipient to provide his or her phone number to activate the account and then calling, the payment instrument described herein includes the signature having activation capabilities. The signature triggers the activation process without the customer having to reach out to a customer representative. As such, the process of activation is not just automated but also initiated by a feature on the payment instrument that is otherwise inactive and merely ornamental and design related.

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired."

As used herein, RSSI, or "Received Signal Strength Indicator", is a measurement of how well the payment device can hear a signal from an access point or router, such as Wi-Fi card of the payment object reader. RSSI is a term used to measure the relative quality of a received signal to the POS terminal, but has no absolute value.

Additionally, as used herein, the term "payment card," "payment object," or "payment instrument" refers to a payment mechanism that includes a debit card, a credit card, a prepaid gift card, or the like, a smartcard that has an embedded integrated circuit chip (e.g., Europay-MasterCard-Visa (EMV) card), a proxy card, or any card that functions as a combination of any of these mechanisms. The term "proxy object" as used herein refers to a card that may or may not bear a card number/account number that appears to be that of a real credit or debit card account (i.e., it is in the correct format), but where that card/account number is actually only a proxy for the customer's real card/account number. Another type of payment object is a biometrically identifiable instrument, which may be initialized using a person's finger (e.g., for fingerprint recognition), face, iris or retina, heartbeat, etc.

Alternatively, the payment object can be a software instrument or virtual instrument, such as a virtual wallet configured to initiate contactless payment transactions, e.g., a key fob, a mobile device having an RFID tag, etc. Other examples of payment object may also include a prepaid card, a gift card, a rewards card, a loyalty points card, a frequent flyer miles card, checks, cash, or in general, any kind of financial instrument that holds financial value or provides a promise to pay at a later time. Thus, a payment object transaction (also referred to as payment card transaction) may be any be a transaction where a merchant or a user swipes the user's credit card through a payment object reader in exchange for a product or service offered by the merchant.

The term "swipe" here refers to any manner of triggering a payment object reader to read data from a payment object, such as by dipping into, tapping, hovering, bringing in close contact or passing the payment object into or through a payment object reader.

The term "broadcasting" refers to the modes of operation of the Bluetooth enabled device to enable connection with neighboring devices and can be either discoverable mode or advertising mode. Discoverable mode is a state within Bluetooth technology integrated devices that enables Bluetooth devices to search, connect and transfer data with each other. Discoverable mode is used to propagate the availability of a Bluetooth device and to establish a connection with another device. In some cases, the device can also be in the "non-discoverable" mode, which prevents devices from being listed during a Bluetooth device search process. However, a non-discoverable Bluetooth device is visible to devices that know its address or can discover its address.

The term "advertising" is meant to refer to another mode of operation of the Bluetooth enabled device. Both broadcasting and advertising help initiate, establish, and manage the connection with other devices. If the device just needs to communicate the status of a few parameters or alarms and does not absolutely require acknowledgement from other side, the BLE advertising mode may do the job with just a few commands sent to the BLE controller. When advertising mode is enabled, the BLE device will start to transmit special packets carrying advertising information as Payload Data Units (PDU) on the RF channels dedicated for this purpose. BLE is utilizing a common structure of over the air packets for advertising and data channels. An advertising channel PDU has a header and actual payload. The header contains information about the size of the payload and its type: advertising channels are used for exchanging information before making a connection between devices. Hence, different payload types are supported to broadcast information about the device's ability (on inability) to support a connection, to request more information or to respond with additional device information and to request the initiation of a data connection with another device.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The registration or verification technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

Turning now to the Figures, FIG. 1 is a network environment 100 that illustrates a point-of-sale (POS) system(s) 101, comprising of payment devices, such as a POS terminal 104 and a payment object reader 110, which may be manned by a merchant at a merchant store 106. The POS system 101 can communicate with another communication device, hereinafter referred to as a merchant communication device (not shown) or a customer communication device 107, such as mobile phone or tablet of a customer 102. For example, the customer 102 initiates communication with the POS system 101 to initiate payments, such as contactless payments, through registered communication devices, such as the customer communication devices 107. For this, the customer 102 taps the mobile device 107 on a surface of the payment object reader 110. In another example, the customer 102 can also initiate payments through payment instruments (also referred to as payment object), such as registered credit cards or debit cards authorized with a predefined amount. Besides payment related tasks, the customer 102 can also initiate communication with a service agent 109 of a payment processing system (PPS) 116 for technical support related to the activation of the payment instrument 108 or any of the applications on the customer communication device 107. For example, the customer 102 contacts the service agent 109 to register a communication device 107 or a new and/or deactivated payment instrument 108 for payments. In another implementation, the customer 102 initiates communication to register a payment instrument 108 through a mobile payment application 114 executing on the customer communication device 107, or by contacting the service agent 109 by phone, electronic mail or other means of communication. The payment instrument can be a card with magnetic stripe or smart chip or both and may work with EMV, magstripe, and other payment technologies.

The customer communication device 107 is communicatively coupled to the PPS 116. Some of the advantages of this association are that data can be stored remotely on the PPS 116, especially sensitive payment data. Furthermore, the remote server can provide scalability, failover management, centralized and automated backup services, and faster access to data.

The customer communication device 107 can be a mobile device or a desktop device. Mobile devices include smart phones, tablet computers, laptops, mobile wearable devices like Apple® watch or a Fitbit®, or other mobile data processing apparatus. Additionally or optionally, the customer communication device 107 may also include a sensor 128, such as a camera, or antenna 150 or transmitter/receiver 146, to receive and process environment characteristics, for example, location of the device, and the like. The device 107 then saves such environment characteristics either locally or sends to the payment processing system 116, which then connects the data to a customer's identity or signature. The device 107 also has characteristics that can be tracked, detected and monitored either through another application on the device 107 or by engagement with a button, such as a start button and the like. The device characteristics include registration number associated with the device, the type of signals emitted by the device 107, whether communication ports are enabled, whether Bluetooth is enabled, and so on. The customer communication device 107 also includes an image-capturing sensor 128, such as a camera, or a scanner, to obtain a representation of a signature or other pattern printed on a payment instrument.

The customer communication device 107 also includes a network interface 148 to allow communication with other devices using a variety of communication protocols. For example, multiple network interfaces may be employed to allow for the communication over broadcast, multicast, and/or unicast networks. Through a communications network 118, the customer communication device 107 is accessible through remote clients (e.g., computers with web browsers). Network interfaces 148 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the device 107.

In some implementations, the network interfaces 148 may be communicatively coupled to hardware components, which facilitate detection of payment cards. For example, the network interfaces may couple to a payment card slot or rail designed to accept payment cards through swipe or insertion or any other action. In another example, the network interfaces may couple to one or more sensors included to detect or read the registration feature, such as the signature or any such pattern.

In various embodiments, the network interface 148 may also support wireless data transfers between the device 107 and external sources, such as clients and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s).

The customer communication device 107 may also comprise any sort of mobile or non-mobile device that includes an instance of a payment application 114 that executes on the respective device. In some instances, the payment application 114 can execute on a device separate from the customer communication device 107, for example another customer communication device 107 associated with the customer 102. The payment application 114 may provide POS functionality to the device 107 to enable the customer 102 (e.g., a buyer, an individual user, etc.) to accept and send payments after registering or otherwise associating assigned payment instruments (such as payment objects and/or communication devices 107). The customer communication device 107 can include a display for displaying notifications, visual cues, and interactive fields to interact with the PPS 116.

The interactive fields can also be accessible via the payment application 114 to allow the buyer to register a payment instrument. For example, the interactive fields, when selected or pressed or otherwise engaged, can generate a set of instructions for the customer 102 to follow to register the payment instrument 108. For example, one of the instructions define the manner in which the customer 102 should obtain an image of at least a portion of the payment instrument 108, say the portion where the custom signature is visible. In another example, the interactive fields or selectable icons when selected establish a communication channel between the customer 102 and a service agent 109. The communication can be in the form of text, electronic mail, phone call, or any other kind of notification. The payment application 114, too, has application characteristics or profiles associated thereto. The payment application characteristics and profiles, include for example, application version history, status of APIs or handlers executing on the application, error log, transaction log, and so on. The states of the payment application 114 can also be sent to the PPS 116 from time to time, and the instructions of how to collect state can be dictated by the state machine 136. Analysis of states helps determine the unique profile of the customer 102. While payment application characteristics and device characteristics are distinct from each other, most applications execute on devices. Therefore, for the purpose of this application, person skilled in the art can assume device characteristics or profiles and device states to include payment application characteristics or profiles. Also, the characteristics and profiles are assumed to be environment metadata, which is encrypted along with the signature provided by the customer. The environment metadata, as described later, provides another layer of security or verification at the time of registration. In one implementation, the metadata includes the characteristics, state of the devices, applications and other entities in the environment of the communication device 107. Such metadata may also be embedded in the payment card. In another implementation, metadata includes a pattern obtained as a combination of the signature, the chip, and embedded metadata, and the placement or pattern generated as a combination.

The term "mobile payment application" or "mobile payment portal" as used here, refers to any registration application that enables communication between users (e.g., sender and recipient of a message) over a wired or wireless communications network. The registration application can be employed by a service provider that delivers a communication service to users, e.g., chat capability or capability to request customer support through ticket creation The registration application may include one or more components and/or engines, or a component and/or engine can include one or more applications. The registration application can include, for example, a mobile payment application, a text messaging application for communication between phones (e.g., conventional mobile telephones or smartphones), or a cross-platform instant messaging application for smartphones and phones that use the Internet for communication.

The registration application can also include, for example, a web browser application installed on the payment entity, such as a device 107 or a POS terminal 104, accessible via a uniform resource locator (URL). In some embodiments, the URL is identified by a graphical user interface (GUI) of a mobile payment application installed on the payment entity.

In one implementation, the POS terminal 104 can be a POS terminal operated and managed by a merchant(s). Furthermore, the POS terminal 104 can be of a varied hardware and/or software configuration, such that POS terminal 104 may be an Android device or an iOS device. In another example, POS terminal 104 can be a cellphone or a tablet computer. The POS terminal 104 can be an electronic point-of-sale system that is connected to a payment object reader 110 capable of accepting a variety of payment instruments, such as credit cards, debit card, gift cards, near-field communication (NFC) based payment instruments, and the like. In one implementation, the payment object reader 110 can accept a payment instrument that is capable of being registered through a signature associated with it. Such a payment instrument with an active-passive registration element, e.g., a customized signature, provided by the user is discussed herein.

The POS terminal 104 can be connected to a central processing server, hereinafter referred to as the payment processing system (PPS) 116, to obtain inventory of available products and services and risk parameters. The POS terminal 104 can work in both online and offline modes to allow the merchant to both access the inventory and provisionally process payments whether or not the communication network between the PPS 116 is established or not.

In some types of businesses, the POS device 104 may correspond to a store or other place of business of the merchant, and thus, may be a fixed location that typically does not change on a day-to-day basis. In other types of businesses, however, the POS system 101 may change physical location from time to time, such as in the case that the merchant operates a food truck, is a street vendor, a cab driver, etc., or has an otherwise mobile business, e.g., in the case of merchants who sell items at buyer's homes, places of business, and so forth. As mentioned before, the POS terminal 104 is connected to a payment object reader 110 that receives the payment object. The payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader 110 may include hardware implementation, such as slots, magnetic tracks, and rails with one or more sensors or electrical contacts to facilitate detection and acceptance of a payment object.

, In the figure, the PPS or the device 107 is shown to include certain components. The components may be distributed between the device 107 and the payment processing system 206. The payment processing system 116 may have limited memory and may only receive cached data when analyzing but otherwise the cached data and components may be stored in the device 107.

In one implementation, the payment processing system (PPS) 116 includes one or more components configured specifically to allow the PPS 116 to activate a payment instrument through registration features, such as signatures on payment instrument, through device or applications, such as device 107 and application 114, and its corresponding device characteristics, profiles, signatures, or fingerprints and store as state along with timestamp at which state status is obtained.

The components of the device 107 include, for example, a device detection component 140, a mapping component 138, a state machine 136, a location tracker 139, a customer profile data-structure within a database 144. The customer profile data-structure includes tables related to transaction history, interaction of the customer with the devices, including PPS, the customer account history, the device configuration, the encryption/decryption keys, payload or detection sequences, the payment instrument history, error logs, mobile payment application configuration, customer location history, device location or states, any conditions or restricted controls to be applied to the customer's account and so on. As mentioned before, in one implementation, these components can be part of a POS terminal, such as POS terminal 104, connected to the payment processing system 116. The PPS is communicatively connected to an entity that can be a payment application (not shown), or a device 107. The payment entity has device characteristics that include but are not limited to: timing parameters, radiated performance, wireless performance, quality of communication links, radio frequency response, transmission measurements, receiver measurements, and engineering tolerances. The communication interface 148 includes ports that can be hardware or software implementations, and can allow the payment entity to communicate with other entities, such as PPS 116, for example the service agent 109 can communicate with the customer 102 through communication established via communication interface 148. The payment entity also includes a display 112 where visual cues may be represented to the customer 102, for example, instructions of how to collect and send data related to state of the device 107.

In one implementation, the device detection component 140 is configured to detect devices through physical device characteristics, such as mechanical and operational differences, associated with a device accompanying a merchant. The communication protocol network interface 148 includes various communication protocol interfaces available to the payment processing system 116 with which it can interact with other wireless devices, e.g., customer associated devices. The device detection component 140 is also configured to generate a state, such as a profile of the communication device in response to a received device characteristic, and to determine unique attributes of the payment entity, that can then act as secondary authentication to the signature at the time of activation of the payment instrument.

The device detection component 140 may also accompany request for information with specific sequences or payload, which it generates or modifies based on the available communication ports. The payload may either be common between all devices being registered or unique for each payment entity. The payload can be a data signal or a series of instructions that trigger the payment entity or certain components, like the transmitter or sensors, to respond. The nature of responses from the payment entity or the content therein can be unique based on the device. The responses from the selected devices can also be in the form of affirmative or negative answers to queries from the payment entity. The responses, whether binary or textual information, can be conditioned.

The state machine 136 performs at least the tasks performed by the device detection component 140 and also tracks the state of the device. For example, each time an activation request is made, or a device is queried, a new state may be obtained by the state machine 136. The states are stored, with a timestamp, in state data structure. In one implementation, the state machine 136 is configured to query the device 107 for state information at periodic or predetermined time intervals. In another implementation, the state machine 136 can query the device 107 at random time intervals to determine or when an activation request is made or account is set up with the payment service. The state machine tracks data related to location of the device, and monitors activity (such as transaction activity, movement activity for example movement from one location to another) to determine unique trends and data associated with the customer and device, and stores such trends and environmental data in customer profile.

The PPS 116 also includes a location tracker 139 tracks the user's mobile device and the merchant point of sale device to push information based on proximity through for example, short-range communication networks, such as Bluetooth, BLE, and NFC technologies. The location tracker 139 allows and enables the PPS to create APIs for functionalities such as determining which protocols or ports are available in proximate devices, which devices are proximate, for creating receipts, associating rewards, recording loyalty points, etc. global positioning system (GPS) thereby allowing PPS to determine a device location, for example. a separate GPS unit (also referred to as the location component) may be used to determine the location of a buyer registering or activating a payment transaction using a feature on the payment card. Alternatively, the GPS unit by communicating with a chip on the payment instrument, can determine when the instrument reaches a specific location. The GPS or WPS (Wi-Fi positioning system) unit may work on any of the protocols mentioned above. The location information may be used to advertise location specific information to the user. WPS uses surrounding wireless networks to triangulate the location where the photo was taken, unlike GPS, which uses satellites. According to related aspects of the present subject matter, triangulation of data may be by "direct" triangulation, e.g., as where the identity of the buyer device is determined from the point of intersection (or the point of least squares fit) of multiple device profiles or fingerprints (from multiple fingerprints corresponding to detection sequences). Alternatively, or in addition, triangulation may be "indirect," as where the identity of the buyer device is determined not only from the device fingerprints, but also from relative fingerprints originating from other devices in the proximity or historical purchases. The present subject matter also includes implementations where images that are taken by the customer are geo-tagged and the compared to the delivery location of file to determine whether or not a fraudulent attempt is being made to activate the card.

The present subject matter includes methods and systems to register or activate a payment instrument 108 with the payment processing system 116 by leveraging one or more registration features 126 of the payment instrument 108. In one implementation, the customer 102 or the payment processing system 116 assigns a unique signature 126 to the customer 102, where the signature or a representation of the signature (also called as pattern herein) may be embedded, printed or otherwise associated with the payment instrument 108. The customer 102 after receiving the payment instrument 108 accesses the mobile payment application 114 to register the payment instrument 108. The mobile payment application 114 generates customized flows including actions to scan, photograph or read the signature of the payment instrument 108. The mobile payment application 114 then sends the scanned image to the payment processing system 116, which compares the scanned image to the encrypted signature as provided by the customer before the payment instrument was dispatched. In one implementation, the mapping component 138 compares a pattern (obtained when the user captures an image of the payment instrument) and a stored signature (obtained when the user finally connects with the server).

If the comparison yields a positive match (that is the states are within predetermined threshold value or if the deviation from provided signature to image captured at the time of activation is within a threshold), that is, if the scanned image matches the signature corresponding to the customer and/or associated mobile communication device 107, the payment instrument 108 is activated. Additionally, the payment processing system 116 applies conditions, such as usage conditions or credit limit, etc., to the payment instrument 108 at this time. However, if the scanned image does not match any of the signatures in the database of the payment processing system 116, the payment processing system 116 does not activate the payment instrument 108 and generates a notification for the customer 102 to contact a service agent 109 or visit a website instead.

After the payment instrument is activated, the payment instrument can be used at any payment entities including POS terminal 104 or reader 110. For the sake of completeness, when using the instrument at the locations, the data is sent to the PPS 116 for further processing. On receiving authorization or contemporaneous to the authorization step, the POS terminal 104 or the payment processing system 116 on behalf of the merchant, generates a fund transfer request for the amount of product or service requested by the merchant 103. The PPS 116 can be a cloud computing environment, a virtualized computing environment, a computer cluster, or any combination thereof. The PPS 116 can analyze the fund transfer request based on a plurality of rules stored in a knowledge database (not shown) before sending the fund transfer request to a computer system 120 of the PPS' acquirer or merchant's acquirer (hereinafter "acquirer 120"). For example, one of the rules in the knowledge base may be determining whether the request was authorized based on device fingerprinting as authentication in the offline mode. In one implementation, the acquirer 120 is a bank or financial institution that processes payments (e.g., credit or debit card payments) and may assume risk on behalf of a merchant 103 or a plurality of merchants 103 aggregated by and represented under PPS 116. The acquirer 120 sends the fund transfer request to the computer system 122 of a card payment network (e.g., Visa, MasterCard, Discover or American Express) (hereinafter "card payment network 122") to determine whether the transaction is authorized or deficient in any other way. In some implementations, PPS 116 may serve as an acquirer and connect directly with the card payment network 122. The card payment network 122 forwards the data to the computer system of an issuing bank 124. The issuer 124 is a bank or financial institution that offered a financial account (e.g., credit or debit card account) to the buyer 102 or 102A. The issuer makes a determination as to whether the buyer 102A has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 118, including the Internet, intranet, a cellular network, a local area network, a wide area network, or any other such network, or combination thereof. Protocols and components for communicating over such a network are well known and are not discussed herein. Furthermore, PPS 116, the POS terminal 104, and the mobile device 107 can also communicate over the communications network 118 using wired or wireless connections, and combinations thereof. The payment transaction is either approved or rejected by the issuer 124 and/or the card payment network 122, a payment authorization message is communicated from the issuer to the merchant computing device 104 via a path opposite of that described above.

When the transfer of the funds is successful, the transaction is assumed to be processed or completed. Accordingly, a receipt is generated for the user to indicate completion of transaction and details of transaction as proof of purchase. The PPS 116 can also update the inventory and manage employee information related to employee that performed the purchase, for example assign tips, or hourly rate, etc.

Figure 2:
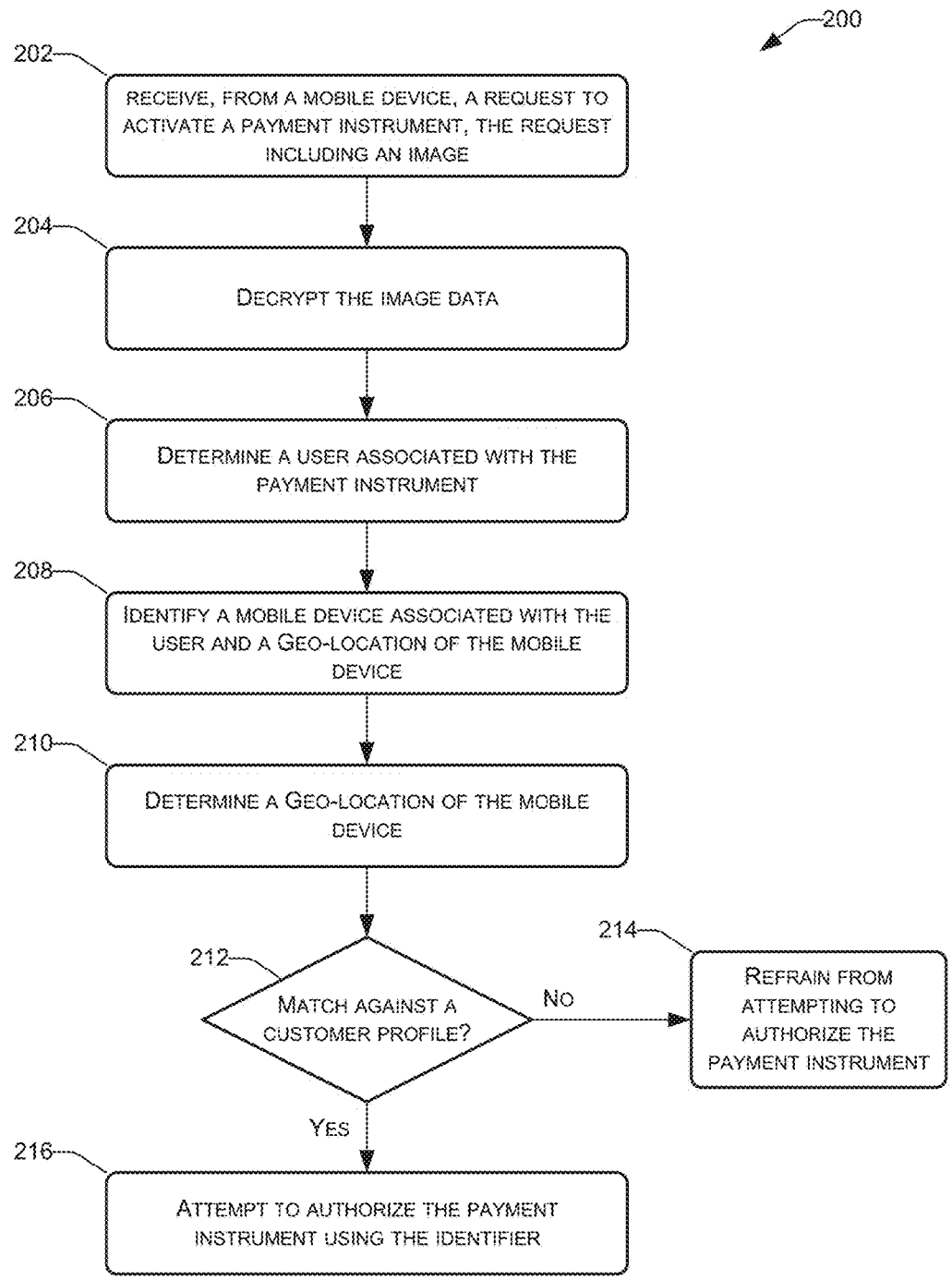
FIG. 2 illustrates a flow diagram of a method for activating a payment instrument by capturing an image of the payment instrument, according to an embodiment of the present subject matter.

FIG. 2 illustrates a flow diagram of a method 200 for activating a payment instrument by capturing an image of the payment instrument. At 202, the process 200 receives, from a mobile device, a request to register or activate a payment instrument, with the request including a representation of a portion of the payment instrument, for example a customized signature displayed on the payment instrument, the signature is interchangeably referred to as a registration feature. The representation can be in the form of an image, scan, or a manual entry of the alphanumeric text or identification of a feature from amongst a list of features displayed on an interface of the device. At 204, the process 200 analyzes the representation and decrypts if need be. Some implementations perform optical character recognition (OCR) on the image or the signature. In various implementations, text recognition can use classifiers such as support vector machines or neural networks or more classical OCR algorithms such as a stretch and warp analysis. In some implementations, additional versions of the text recognition results, such as a set number of the remaining versions of the text recognition results with the highest confidence scores, can also be transmitted to the financial institution for attempted verification. Additional information can also be transmitted to the financial institution such as portions of an address, a name, a card expiration, a CVV, a phone number, an email, etc. In some implementations, the verification occurs by a user performing an inspection of the best guess and verifying that it is correct. In some implementations where individual character confidence scores are conditional on selections at other character positions, versions of the text recognition results can be updated by modifying the individual character confidence scores. For example, where a version of the text recognition results had a 51% confidence score for an "8" character in position 3, and had a 46% confidence score for a "0" character in position 3, and due to the selected character for position 1, "0" is no longer an option for position 3 due to application of the Luhn algorithm, the confidence score for an "8" at position 3 can be recomputed as 97%. In some implementations where individual character confidence scores are not conditional on other character positions, but a total confidence score for a version of text recognition results is conditional on individual character confidence scores for that version, the combined confidence score for a particular version of the text recognition results can be recomputed based on the selected character being attributed a high confidence score. Taking a simplified example where the account data comprises only four numbers, and one of the versions of the text recognition results with corresponding individual character position confidence scores, denoted "character": score, of: {"2":38%, "5":98%; "4":76%, "8":60%}, the initial total confidence score can be the average:

68%. If the selected character is "2" for position 1, this version of the text recognition results can be updated to have the corresponding confidence scores: {"2":100%, "5":98%; "4":78%, "8":60%}, thus the total confidence score can be updated to be the new average: 84%.

At 206, the process 200 may determine a user associated with the payment instrument, for example based on the customer profile. For instance, where the user (e.g., the customer in the transaction) maintains a user account at the entity performing the process 200, the user account and, hence, the user, may be identified by mapping the determined information of the payment instrument with the user's account. After identifying the user and user account, a user device associated with the user may be determined at 208, along with a current geo-location of the user device, such as a phone, tablet computing device, etc. That is, in instances where the user has allowed the sharing of the geo-location of the user's device with the entity (e.g., payment service), the entity may determine a current geo-location of the device. At 210, the process 200 may also determine a current geographical location of the customer device at which the transaction is being conducted, again with (e.g., advanced) consent of the customer.

At 212, the process 200 compares the analyzed data and current location of customer and device and other device state to previously stored customer profiles to determine whether or not the holder of the payment instrument is authorized to activate the payment instrument. The payment service can request additional information, such as an identifier of the payment instrument, an expiration date of the payment instrument, a card network of the payment instrument, a CVV of the payment instrument, or the like, as secondary tool of activation of instrument. If the image matches a saved profile, it is more likely that the image provided by the customer device is in fact a current image of the user's payment instrument rather than a fraudulently obtained image. If the proximity is not within a threshold distance, then at 214 the process 200 may refrain from attempting to activate the payment instrument. In other instances, the process 200 may additionally or alternatively contact the user associated with the payment instrument to receive secure and explicit approval to activate the payment instrument.

Figure 3:
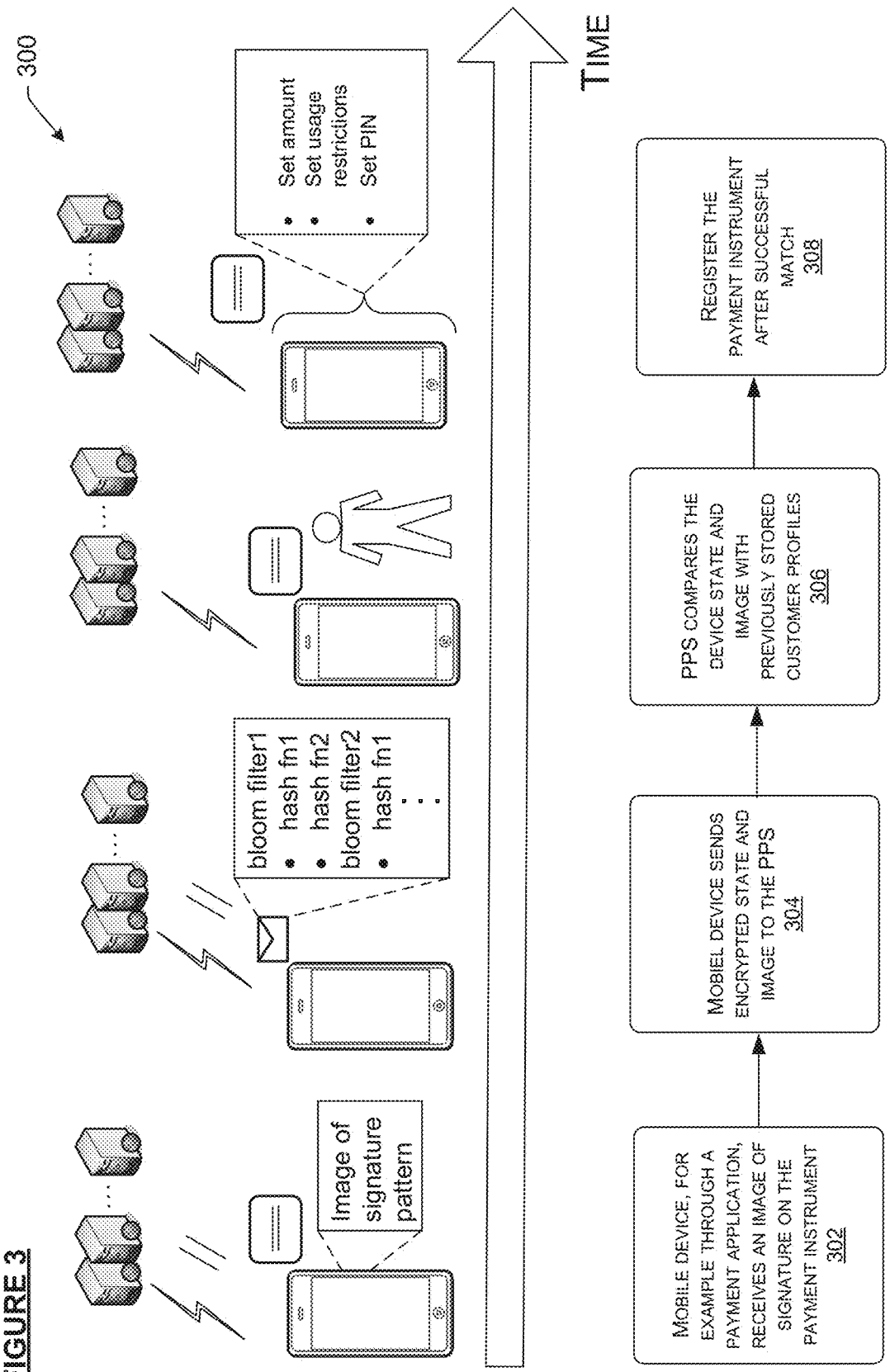
FIG. 3 is a timing diagram that illustrates the timing of various steps of activation of instrument between the mobile device and the payment service, according to an example embodiment of the present subject matter.

FIG. 3 illustrates a process 300 for an example scenario showing interaction between a customer and a mobile payment application after the customer receives a payment instrument and wishes to register the payment instrument through the mobile payment application, according to an embodiment of the present subject matter.

FIG. 3 illustrates, at 302, a customer, after receiving a payment instrument configured as per signature provided at the time of sign-up, captures an image of the signature displayed on the payment instrument. In some implementations, the signature may be embedded or otherwise not visible to the naked eye. In such cases, the mobile payment instrument indicates to the customer the portion of the payment instrument that is to be scanned. In yet other implementations, the customer captures a pattern, including the signature, the metadata embedded in the payment instrument, the placement of the chip and card number, and optionally, other ornamental features such as the color, et. The metadata includes environmental data such as data corresponding to the mobile device of the customer, the mobile payment application executing on the mobile device, and other environmental data that the PPS collects at the time of registration of the payment instrument. The definition of pattern also includes the unique placement of the pattern on the payment instrument.

At 304, a customer communication device encrypts the obtained signature and additionally or optionally sends encrypted data associated with customer communication device to a payment service such as PPS. For example, the customer communication device has installed thereon a mobile payment application or is of a certain model or is located at a certain geographic location The PPS may save the encrypted data in a customer profile. In some embodiments, a customer may modify the respective customer profile, and may select a set of criteria to be included in the encrypted data. The set of criteria may include, but is not limited to, information regarding prior payment instrument approval (i.e., designating the customer as trusted), customer information, the time of issue, merchant location and so on. The PPS too requests for data such as error logs and other information in the form of state of device at time T1. In some embodiments, the encrypted data may include information regarding device and application configuration.

As depicted at 304, the data may be encrypted using bloom filters with hash functions. Each bloom filter may be sized based upon the customer profile of the particular merchant. In various embodiments, the size of a bloom filter (i.e., size of the array and number of hash functions) may be determined based upon a false positive tolerance. In such embodiments, the false positive tolerance may be a factor of the importance of each criterion. Thus, the more important the criterion, the lower the tolerance for a false positive.

At 306, the PPS may determine, based on the state extracted from the encrypted data, including the signature, whether the payment instrument can be registered and authorized to the customer for future use. For example, the PPS determines, based on the state and the signature (decrypted from the encrypted data) matching a previously stored signature corresponding to the customer or mobile payment application of the customer, that the payment instrument is activated. If no match is obtained, the PPS can block the payment instrument and assume for it to be in the hands of a fraudulent user. In another implementations, the PPS can send instructions for the customer to connect with a service agent or access a website where personally identifiable information can be provided for registration.

At 308, the PPS can authorize the payment instrument as a registered instrument and allocate conditions and amount for enabling use. Thus, a signature that is otherwise a passive element is used to activate a payment instrument.

Figure 4:
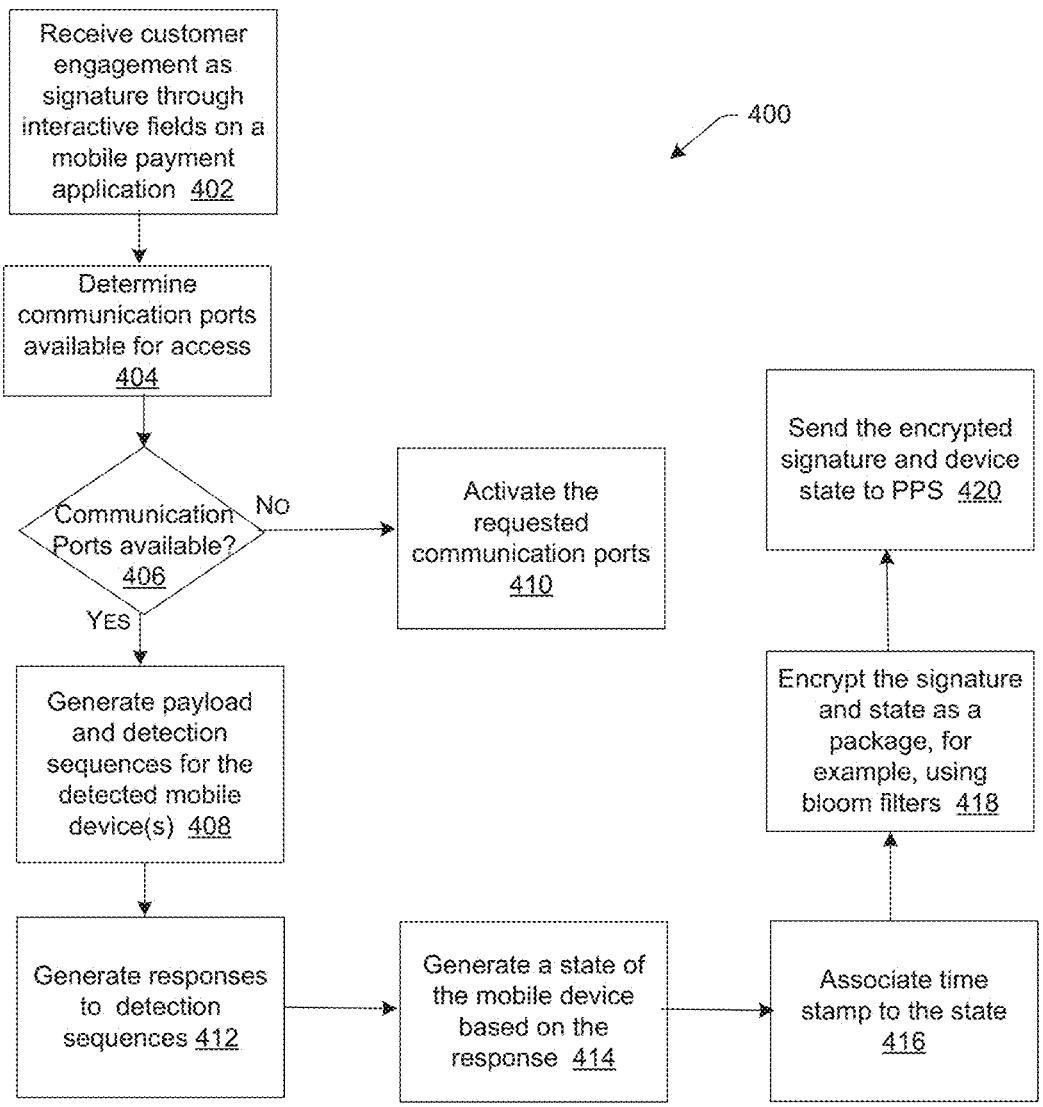
FIG. 4 is a dataflow that illustrates the method of detecting mobile devices, and their states to use towards activating a payment instrument, according to an example embodiment of the present subject matter.

FIG. 4 is a sequence flow method that depicts detecting a device registered to a customer at the time of a first interaction between the customer and the PPS for account set-up prior to or contemporaneous to registration of a payment instrument, according to an embodiment of the present subject matter. The process 400 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 1, such as POS terminal 104 or payment object reader 110. As illustrated in FIG. 4, the process 400 includes a set of operations from step 402 to step 420.

In one implementation, the detection of device and creation of a device profile is performed prior to the registration of the payment instrument. In some implementations, the creation of the device profile may happen on a device separate from the device used at the time of registration. In such cases, the customer may create several device profiles or associate several profiles with a single device.

The process 400 starts with the operation at step 402. A customer 102 indicates through interaction with a software interactive field on the payment application or a physical button on the communicative device 107 that the customer 102 wishes to provide a signature. The signature can be in the form of an alphanumeric text, image, pattern, or a combination thereof. For this, the mobile payment application or PPS can generate an interface, for example a touch screen or key interface, where the customer 102 can manually key in information. In other examples, the mobile payment application or PPS provides pre-set options, which the customer 102 can choose as signature. For example, the pre-set options may include stock images randomly selected for the customer 102. In other instances, the pre-set options may be configured for the customer 102 based on device profile, environmental data, or other data obtained from the customer like personal identifiable information.

Once the signature is provided, the PPS 116 collects environmental data corresponding to the customer interaction including, but not limited to, device profile. Thus, the PPS may store the location coordinates of the device 107. The PPS proceeds to detecting location of the POS system 101 through location detection techniques, such as techniques based on triangulation, trilateration, multi-laterations, geo-fence, global or local positioning systems, and the like. This step may be performed contemporaneous to the steps of scanning the device described below. The payment processing system 116 scans device 107 and applications, including the mobile payment applications, executing on the device for environmental data. The PPS 116 obtains authorization from the customer.

The PPS then determines how it can interact with the recognized buyer device or devices. For this, the PPS sends preliminary signals or data to explore communication ports in the device 107, which are available for access and communication (step 404). If there is at least one communication port available as determined in step 406, the flow control moves to step 408. In some cases, the PPS may detect a number of communication ports that are available or can be made available on request. In such cases, the customer selects a communication port. In other cases, the selection process can be automated such that ports that meet certain conditions are enabled or used. For example, only power-saving or time-saving communication channels are set up.

If no ports are available for access, the flow transitions to step 410 where the customer is notified to activate certain ports to allow communication. Such notifications may be sent through text or push notifications. After activation, the flow either moves to 406 for confirmation or directly to 408.

At step 408, the device detection component 140 of the PPS generates payload and/or detection sequences adapted based on the available communication ports and in accordance with the communication protocols on which the ports operate. The payload and detection sequences can be configured based on type of the POS system 101 (such as the type of terminal—Android based, iOS based and so on). In some implementations, a unique payload is generated every time. The detection sequences can be in the form of specific signals requesting the device to respond in a certain way or to release certain information, such as version number of the device, software version, operating system, error logs, and the like.

The targeted device 107 processes the payload and detection sequences via the appropriate communication ports and protocols (step 412) and responds accordingly. Thus, based on the detection sequences and payload, the device responds in a certain manner and generates state of the device, time-stamped at T1 (or environmental data), which is captured by the sequences or payload or some other signal and stored, for example, in the device itself or sent to the POS terminal via the same or a different communication channel, as shown in step 414. The device state is stored as state value at first time, T1, i.e., the first time customer established communication with the PPS for account set-up. The detection sequences can also be information-gathering requests configured to obtain state, for example in the form of digital device fingerprints, from the devices. Device state also includes radio, mechanical or operational fingerprints—such as radiated performance, device defects, sensor performance, communication speed or lags, spectrum data, the location and time of the transaction or buyer, or the card information, open communication ports, settings of applications, the number of applications running on the devices, memory usage, virus identification, and the like (step 416).

At step 418, the device state at T1 and the signature provided by the customer at step 402 may be encoded at the device level. The payment device can also apply tokenized pseudo-random numbers (also referred to as hash keys) to the feature vectors to generate the digital device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted state can also be created using other schemes, such as fuzzy vault algorithm, a cancelable fuzzy vault scheme based on irreversible hash functions, such as MD, RIPEMD, and SHA.

In some implementations, the device state and signature may be encrypted using bloom filters with hash functions. The bloom filter may use the hash functions to store information about a customer without the risk of the customer's payment information or signature being stolen or otherwise used in a nefarious manner (e.g., through reconstruction). In various embodiments, the hash functions hash or map the customer's signature and device state (i.e., an element) to designated array positions of a bloom filter array to test whether the criterion is met (i.e., a positive match occurs when all of the mapped-to array positions have a value of one "1"; no match occurs, and the criterion is not met, if any of the array positions contain a zero ("0")). In some embodiments, the device state may be truncated to a number less than the standard 16 or 17-digit identifier number. For example, the hash functions may truncate a payment instrument identifier to a 10-digit number, and map the 10-digit number to the bloom filter array. Though bloom filters with hash functions are described herein, it is imagined that the other encryption techniques may be used to maintain the security of state, such as hash tables, simple arrays, and the like. In various embodiments, the device 107 may incorporate a plurality of bloom filters, each designated to determine if the ticket meets one or more criteria of a particular merchant. The criteria may be based on issue level, number of tickets sent over a period of time, interaction history, customer data, customer device information, and/or merchant history. For example, a bloom filter and/or hash function may be designated to determine that a customer has multiple devices at one location (e.g., a laptop, phone, etc.). In some embodiments, the device 107 may incorporate one bloom filter (for a particular merchant) with one or more hash functions, each hash function configured to determine if the customer profile including the device state and/or signature satisfies one or more criteria. Each bloom filter may be sized based upon the merchant profile of the particular customer.

In various embodiments, the size of a bloom filter (i.e., size of the array and number of hash functions) may be determined based upon a false positive tolerance. In such embodiments, the false positive tolerance may be a factor of the importance of each criterion. Thus, the more important the criterion, the lower the tolerance for a false positive.

In various embodiments, the customer and/or PPS may designate a tolerance by inputting a probability percentage for false positives (i.e., a merchant will tolerate a 1% chance of a false positive). The tolerance may be set for all bloom filters in a customer profile, or it may be set per criterion. For example, a bloom filter designated to determine whether a customer profile may be sized such that the probability of a false positive is relatively high (i.e., >1%). Whereas a bloom filter designated to determine if a customer profile is associated with a fraudulent attempt to register may be sized for a low probability of false positives (i.e., <1%).

In various embodiments, the device may comprise at least a payment application for processing transactions. The payment application may receive and store data from the customer profile. In some embodiments, the payment application may process and save data locally on the device.

While in other implementations, the device state obtained at T1, which are to be used for device identification and testing at a later time for payment instrument registration, are then sent to the PPS, as a customer profile, as shown in step 420.

Figure 5:
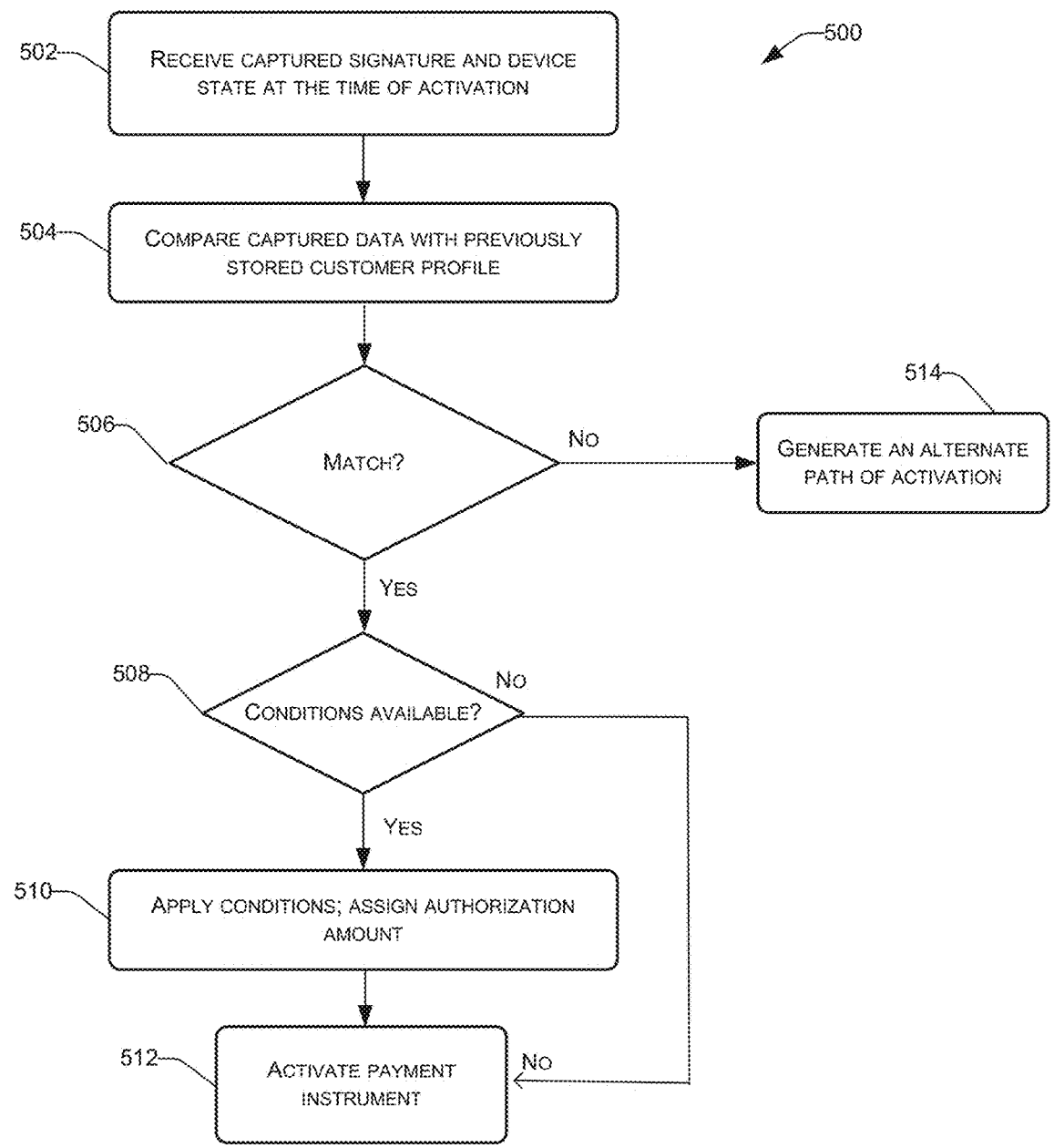
FIG. 5 depicts a sequence flow method that illustrates the method of activating a payment instrument and applying conditions, according to an example embodiment of the present subject matter.

FIG. 5 is a sequence flow method that depicts a method 500 for registering a payment instrument using a device associated with a customer or s payment application associated with the payment service where the payment instrument includes a registration feature as previously provided by the customer, according to an embodiment of the present subject matter. The process 500 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 1, such as customer communication device 107. As illustrated in FIG. 5, the process 500 includes a set of operations from step 502 to step 514.

The process 500 starts with the operation at step 502. On receiving a physical payment instrument with the custom signature, the customer 102 accesses the mobile payment application or a landing page of a website to initiate registration of the payment instrument for use. At step 502, the customer scans or captures an image of the payment instrument or a portion of the payment instrument displaying the signature. The mobile payment application displays to the customer the method of capturing the pattern, which may or may not be visible to the naked eye. For example, the mobile payment application may indicate the customer to place the payment instrument in a certain orientation or fit within a preset shape, to capture image. The device 107 on which the mobile payment application is executing encrypts the signature and optionally, the device state, such as data related to the device 107, mobile payment application 114, location of the device, etc. The PPS 116 receives the encrypted information from the device 107 at step 502.

In response, the PPS 116 retrieves a customer profile packet including device state and signature from the device associated with the customer as obtained at a previous time instant, say at the time of account set-up. The customer profile may be encrypted. In such case, the packet having device state and signature is first decrypted using technologies known in the art (step 504).

The PPS 116 then compares the customer profile packet with newly obtained pattern and other information to authorized activation of the payment instrument (step 506). If the match operation (step 506) as a result of the comparison at step 504 yields a "Yes," the flow transitions to step 508. The PPS 116 confirms to check whether there are any rules associated with the device or customer, which restrict activation of the payment instrument, or if the credit line is to be computed or adjusted. (step 508). In case there are any conditions, the conditions are applied at step 510 and then the card is activated at step 512. If conditions are not available, the payment instrument is activated with default conditions at step 512.

If the match operation (step 506) as a result of the comparison at step 504 yields a "No," the PPS 116 generates an alternate path for the customer to follow to activate the payment instrument (step 514). For example, the alternate path may involve communicating with a service agent. For this, the PPS 116 can generate notifications to alert the customer indicating various options for example, "call customer care," or "provide SSN to proceed."

Figure 6:
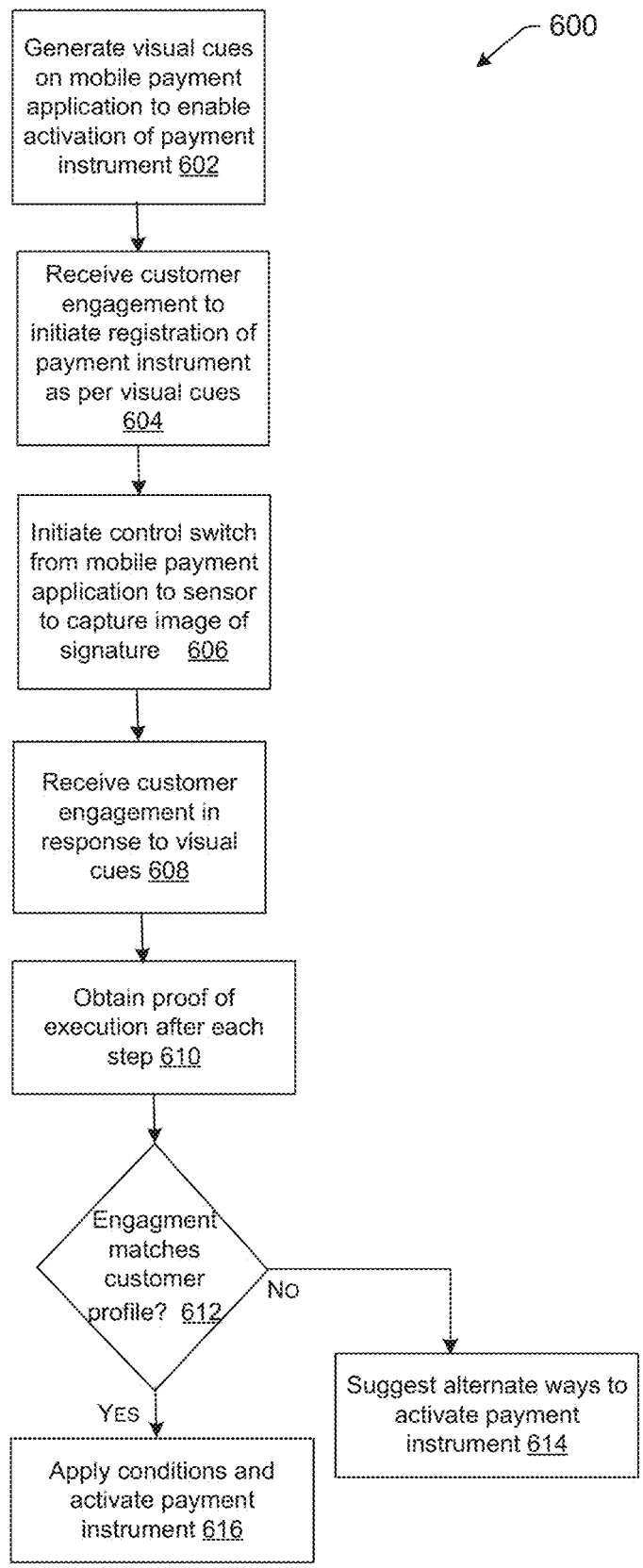
FIG. 6 is a dataflow that illustrates the sensor-based method of activating a payment instrument, according to an example embodiment of the present subject matter.

FIG. 6 is a sequence flow method that depicts a method 600 for activating a payment instrument on a device or application associated with the customer, according to an embodiment of the present subject matter. The process 600 can be performed by one or more components, devices, or modules such as, but not limited to, the customer mobile device, the payment processing system, merchant device or POS terminal, or payment beacon or other components or devices. For the sake of explanation, the description hereinafter is described with reference to components described in FIG. 1, such as customer communication device 107. As illustrated in FIG. 6, the process 600 includes a set of operations from step 602 to step 616.

The process 600 starts with the operation at step 602. The PPS 116 or the mobile payment application 114 receives a ticket indicating a request from the customer to activate the payment instrument. In response, the mobile payment application 114 generates visual cues such as instructions to activate the payment instrument. At this time, the device 107, through its communication interfaces, obtains device state and other environmental data as secondary authentication. The visual cues can be in the form of notifications, such as push notifications. The push notifications are sent to the payment device or the device associated with the customer. For example, the mobile payment application 114 presents on the interface of the payment device real-time and customized instructions, such as, "press a button located at the bottom of the reader," "turn the device off for five seconds", "register your instrument at this time". "move the device an inch closer to the terminal", "do you need additional assistance?", "connecting to a support representative", "your bank has approved registration", and so on. To this end, the customer submits user engagement input in response to each of the activation instructions while the PPS or the mobile payment application 114 waits. Other examples of user engagement input include providing authentication or security keys as a visual, audio or haptic input.

At step 604, the customer engages with the device or the notifications or both to start the process. In response to customer engagement for the first time or at the time of engagement with visual cues, the PPS initiates a mode switch. The modes are switched from merchant control to at least view, edit, or collect mode. In collect mode, PPS can collect information related to customer engagement, for example in the form of environmental data or screenshots as proof of engagement (step 606).

At step 608, PPS receives customer engagement in response to activation path. In some cases, the PPS can request control from the customer and automatically execute certain or all steps described in the activation path. For example, the PPS can automatically push certain updates or delete data from the devices to assist in activation. In one implementation, the mobile payment application 114 switches control from the mobile payment application 114 interface to the sensor, such as camera, to facilitate capturing of an image of the signature on the payment instrument.

At step 610, PPS obtains image, scans or otherwise information indicating engagement with a signature on the payment instrument and device's state after each step of the activation step. At step 612, PPS matches the engagement data as reflected in the obtained images and device state with previously stored customer profiles. If there is a match, that is, "yes" branch of the step 612, PPS continues to allow activation of the payment instrument and applies any conditions or restricted control on the payment instrument. For example, the credit line can be determined and assigned to the customer at this time.

At step 616, however, if the PPS determines that the engagement does not match with any of the customer profiles, either the PPS takes control, for example, for automatic execution of an activation path or under authority of a service agent. In another case, the PPS can generate notifications to alert the customer on an authorized device or an authorized phone number or email address that an attempt is being made to activate an issued payment instrument and the attempt may be fraudulent. In yet another case, the mobile payment application 114 or PPS generates alternate ways to activate the card in step 614, for example, by providing secondary information, like an SSN, PIN, etc.

Figure 7A:
FIGS. 7A and 7B illustrate example user interfaces to indicate that a payment instrument is available for physical delivery to a customer, according to an example embodiment of the present subject matter.
Figure 7B:

FIGS. 7A and 7B illustrate example user interfaces to indicate that a payment instrument is available for physical delivery to a customer, according to an example embodiment of the present subject matter. In FIG. 7A, the interface on a mobile payment application provides an option to the customer to request a physical delivery of the payment instrument. As shown in FIG. 7B, the customer can also see the instrument information, such as number, expiration date, CVV, etc., to enable the customer to use the payment instrument without a physical instrument as well. However, if the customer chooses to request a delivery of the physical instrument, for example in a metal or plastic form, the selectable option such as "mail me a card" gives the customer that flexibility.

Figure 8:
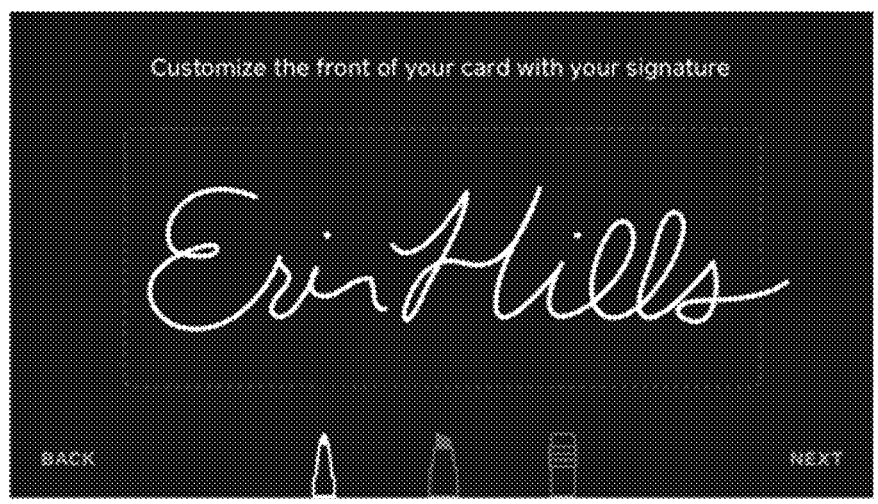
FIG. 8 illustrates a user interface to receive a custom signature from a customer, according to an example embodiment of the present subject matter.

FIG. 8 illustrates a user interface to receive a custom signature from a customer, according to an example embodiment of the present subject matter. As shown in FIG. 8, the customer can customize the payment instrument with a signature for which the interface provides a writing tool. In other implementations, the customer can select from pre-set options, such as an image, an alphanumeric value, etc., as the signature. The customer can also select the location on the payment instrument where the signature should be featured and whether or not it should be visible. For example, in some cases, the signature can be encrypted and embedded in the card such that only certain scanners can read the signature.

Figure 9A:
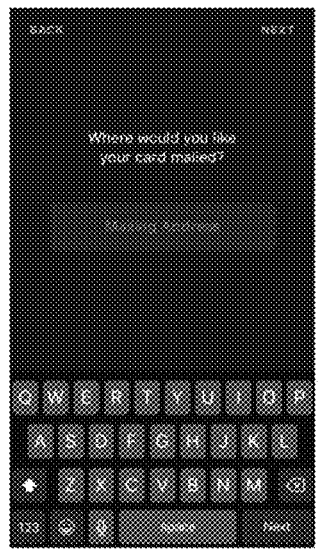
FIGS. 9A-C illustrate example user interfaces, being presented on a computing device, to receive customer engagement for the field of address where the payment instrument is to be delivered, according to an example embodiment of the present subject matter.
Figure 9B:
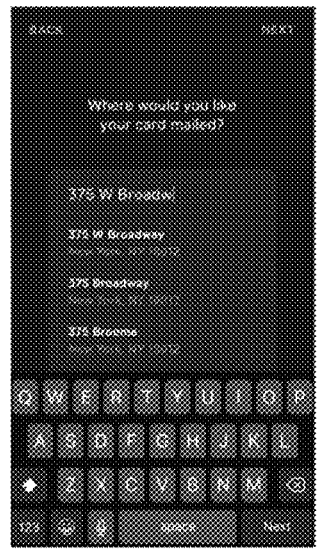
Figure 9C:
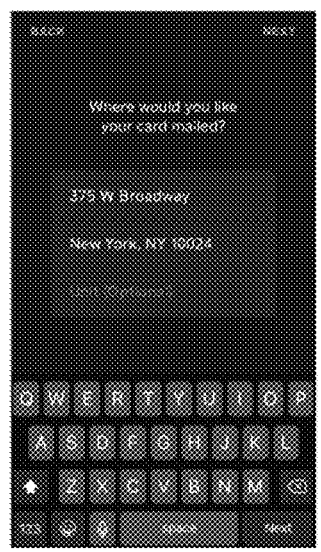

FIGS. 9A-C illustrate example user interfaces, presented on a computing device, to receive customer engagement for the field of address where the payment instrument is to be delivered, according to an example embodiment of the present subject matter. The customer can select the addresses from a list of addresses provided by the customer at the time of account set up. Alternatively, the customer can use the pre-fill or suggestion feature facilitated by the mobile payment application thus as the customer enters the address, the mobile payment application can suggest possible entries.

Figure 10B:
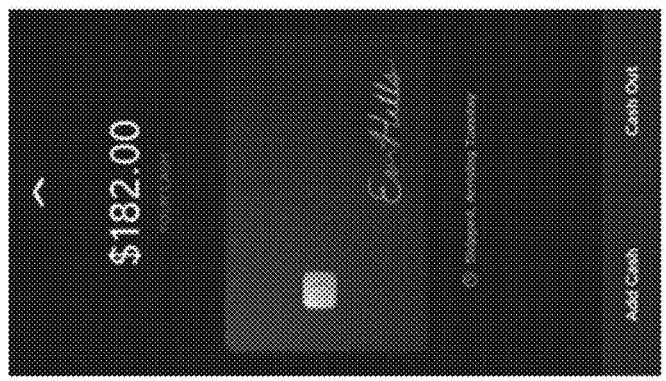
FIGS. 10A and 10B illustrate example user interfaces, being presented on the computing device, to indicate verification and information related to shipping of the physical instrument, according to an example embodiment of the present subject matter.
Figure 10A:
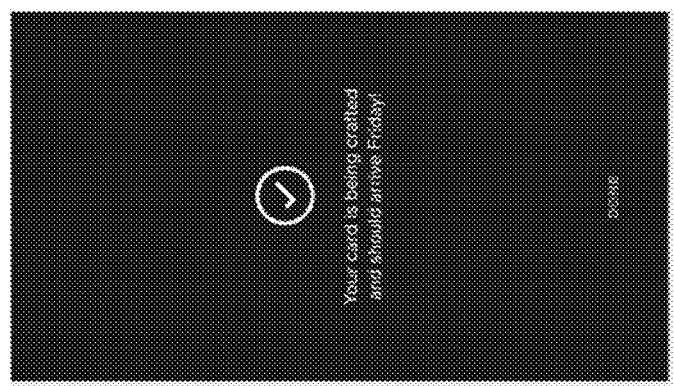

FIGS. 10A and 10B illustrate example user interfaces, being presented on the computing device, to indicate verification and information related to shipping of the physical instrument, according to an example embodiment of the present subject matter. After the customer provides the address information for delivery, the request to generate and deliver the payment instrument is sent by the mobile payment application to the PPS through the computing device. The PPS then facilitates generation of the payment instrument with the customized signature and at a customized location. If the location and signature are not customized, the PPS may randomly generate a signature to be associated with the customer. The signature is embedded, printed, or otherwise associated with the payment instrument. After the payment instrument is crafted, the payment instrument is delivered to the customer. In some instances, a tracking chip within the payment instrument indicates when the payment instrument has reached the customer or whether or not it has reached the location where the customer requested delivery or if the customer is attempting to activate the payment instrument from a location different than the delivery location.

Figure 11A:
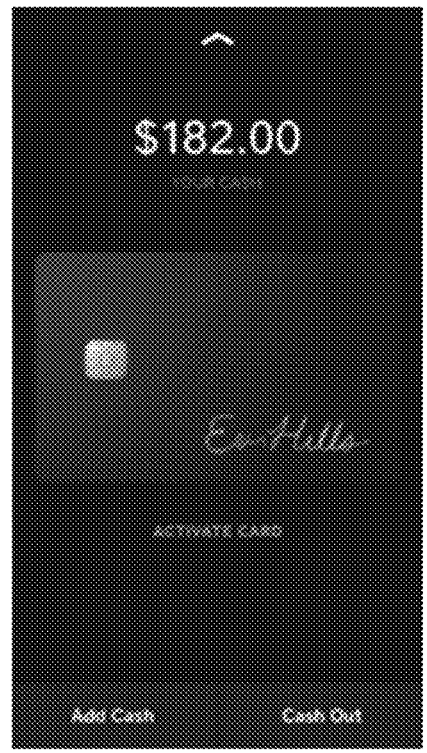
FIGS. 11A and 11B illustrate example user interfaces being presented on the computing device to notify the customer to initiate registration or activation of the payment instrument, according to an example embodiment of the present subject matter.
Figure 11B:
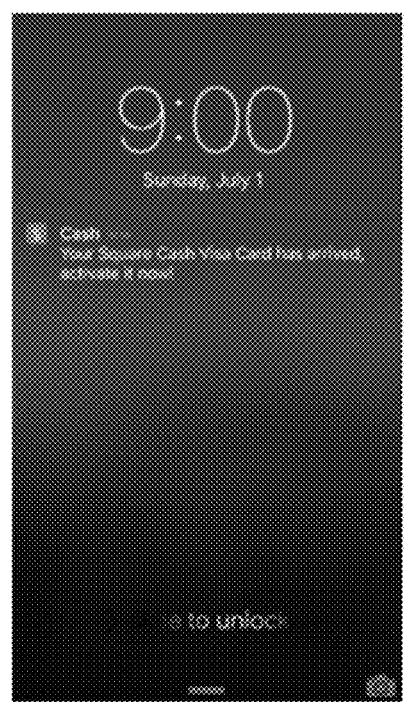

FIGS. 11A and 11B illustrate example user interfaces being presented on the computing device to notify the customer to initiate registration or activation of the payment instrument, according to an example embodiment of the present subject matter. Once the customer receives the physical payment instrument, the method starts at FIG. 11A where the customer is notified through visual cues to activate the payment instrument. This notification can be within the mobile payment application as shown in FIG. 11A or as part of a text notification on home page as shown in FIG. 11B.

FIGS. 12A-E illustrate example user interfaces, being presented on the computing device, for activating a payment instrument by using a registration feature of the payment instrument, according to an example embodiment of the present subject matter.

Figure 12E:
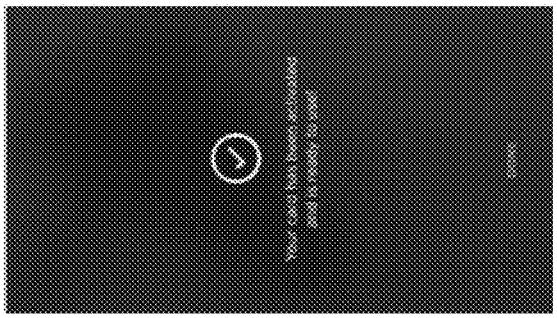
FIGS. 12A-E illustrate example user interfaces, being presented on the computing device, for activating a payment instrument by using a registration feature of the payment instrument, according to an example embodiment of the present subject matter.
Figure 12D:
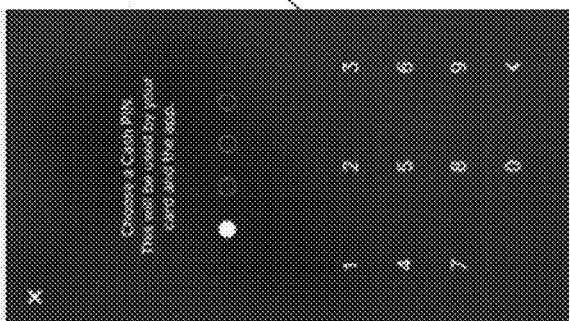
Figure 12C:
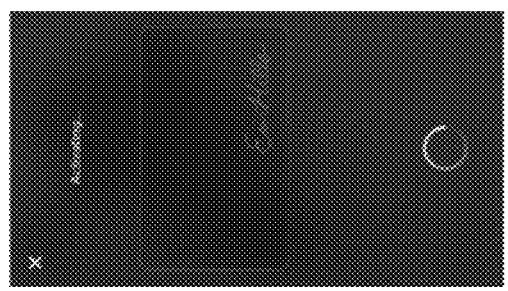
Figure 12B:
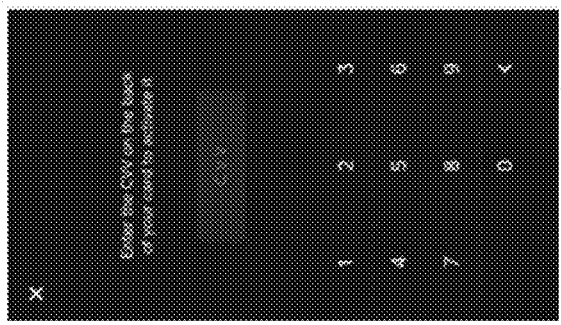
Figure 12A:
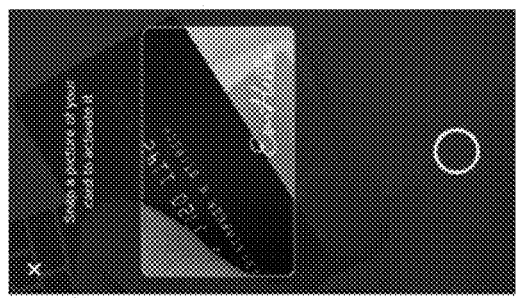

FIG. 12A shows example visual cues on the mobile payment application that the mobile payment application or PPS generates to enable the customer to activate the payment instrument. As shown, the mobile payment application sends cues to snap a picture of the payment instrument for example by placing or fitting the payment instrument within a preset shape on the user interface of the mobile device. In other instances, the payment application can send visual cues to scan the payment instrument. By placing the payment instrument in a prescribed shape or orientation, the mobile payment application or PPS is able to read the signature by extracting relevant data from certain coordinates. Along with the signature, the mobile payment application can also ask the customer to key-in the CVV printed at the back of the payment instrument as shown in FIG. 12B.

During this time, the mobile payment application can also collect environmental data, such as data on the location, the device, the application, etc., as secondary authentication of the customer. The confirmation process is shown in FIG. 12C where the mobile payment application compares the obtained data and signature image with previously stored profiles. This step can be performed in both online or offline modes.

Once a match is obtained and identity of the customer is verified against the instrument holder, the payment instrument is activated as shown in FIG. 12E. In some implementations, a PIN number can be assigned as shown in FIG. 12D. It will be understood that the interfaces are shown as examples only and any layout, orientation, color scheme, and arrangements are possible.

Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

Although the present subject matter has been described with reference to specific example embodiments, it will be recognized that the subject matter is not limited to the embodiments described, but can be practiced with modification and alteration within the spirit and scope of the appended claims. Accordingly, the specification and drawings are to be regarded in an illustrative sense rather than a restrictive sense. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof.

A sensor-implemented method for activating a payment instrument associated with a user through a mobile payment application associated with a payment processing system (PPS), the method comprising providing an engagement option on a user interface of the mobile payment application executing on a mobile device of the user; detecting, by a processor of the mobile device and in response to an interaction of the user with the engagement option, an indication that the user has submitted a signature to be associated with the payment instrument; generating a request, from the mobile payment application and for the payment processing system, to cause a physical delivery of the payment instrument to a user location, wherein the payment instrument includes a pattern that substantially corresponds to the signature submitted by the user; receiving, by the processor of the mobile device, an indication that the user intends to activate the delivered payment instrument having the pattern; generating, on the interface of the mobile payment application, a set of instructions for the user instructing the user to capture an image of the pattern; obtaining, by at least one sensor of the mobile device and as a sensor input, the image of the pattern; transmitting, by the processor of the mobile device, the image of the pattern to the payment processing system; comparing, by a processor of the payment processing system, the image of the pattern with one or more previously submitted signatures including the signature submitted by the user; if the image of the pattern matches a previously submitted signature provided by the user, activating, by the payment processing system, the payment instrument, wherein activating further includes granting the user, by the payment processing system, access to a predetermined amount of funds through the activated payment instrument; and if the image of the pattern does not match a previously submitted signature provided by the user, generating instructions for the user to provide secondary authentication.

What is claimed is:

1. A sensor-implemented method for activating a payment instrument associated with a user through a mobile payment application associated with a payment processing system (PPS), the method comprising:

receiving, by one or more servers of the PPS and from a mobile payment application executing on a mobile device of the user and at a first time, a signature submitted by the user to be associated with the payment instrument;

obtaining, by the one or more servers of the PPS at or near the first time, a first state corresponding to at least one of the mobile payment application or the mobile device;

generating, by the one or more servers of the PPS, a pattern for associating with the payment instrument, wherein the pattern substantially corresponds to the signature submitted by the user;

receiving, by the one or more servers of the PPS and from the mobile payment application, a request for a physical delivery of the payment instrument;

causing, by the one or more servers of the PPS, the signature to be included on or embedded within the payment instrument;

facilitating, by the one or more servers of the PPS, physical delivery of the payment instrument;

receiving, by the one or more servers of the PPS and from the mobile device and at a second time, an image, captured by a sensor of the mobile device, of at least a portion of the payment instrument including the signature;

obtaining, by the one or more servers of the PPS and from the mobile device at or near the second time, a second state corresponding to the at least one of the mobile payment application or the mobile device;

based at least in part on receiving the image, determining, by the one or more servers of the PPS that the payment instrument includes the pattern;

comparing, by the one or more servers of the PPS, (i) the second state to the first state, and (ii) the pattern to one or more stored patterns stored in a database associated with the PPS;

upon determining that the pattern substantially matches the stored pattern associated with the user and that the first state is substantially similar to the second state, activating, by the one or more servers of the PPS, the payment instrument; and upon determining that at least one of (i) the pattern does not match the stored pattern associated with the user or (ii) the first state is substantially different from the second state, generating, by the one or more servers of the PPS, instructions for the user to provide a secondary authentication.

2. The sensor-implemented method of claim 1, further comprising, upon determining that at least one of (i) the pattern does not match the stored pattern associated with the user or (ii) the first state is substantially different from the second state, notifying, by the one or more servers of the PPS, the user using a communication identifier associated with the user that a possible fraudulent attempt is being made to activate the payment instrument.

3. The sensor-implemented method of claim 2, wherein obtaining the first state and the second state includes:
    detecting a list of available communication ports of the mobile device;
    selecting, by the one or more servers of the PPS, a communication port from amongst the available communication ports for communicating with the mobile device;
    establishing one or more communication channels between one or more components within the PPS and one or more components within the mobile device through the selected communication port;
    obtaining, by individual components of the plurality of components, at least one device characteristic corresponding to the mobile device, wherein the at least one device characteristic comprises at least one of timing parameters, radiated performance, wireless performance, quality of communication links, radio frequency response, transmission measurements, receiver measurements, or engineering tolerances; and
    associating, by the one or more servers of the PPS, the first state and the second state of the mobile device based at least in part on the at least one device characteristic.

4. The sensor-implemented method of claim 1,
    wherein the signature comprises at least one of a picture, an alphanumeric value, a shape, or a color; and
    wherein the pattern comprises at least one of the placement of the signature on the payment instrument, metadata embedded in the payment instrument, placement of a chip on the payment instrument, placement of a card number on the payment instrument, or an ornamental feature, wherein the metadata includes data corresponding to the mobile device or the mobile payment application.

5. A method for activating a payment instrument, the method comprising:
    receiving, by a processor of a payment processing system (PPS) from a mobile payment application executing on a mobile device associated with a user, and at a first time, a signature submitted by the user;
    causing, by the processor of the PPS, the signature to be stored in association with a payment instrument corresponding to the user;
    obtaining, by the processor of the PPS at or near the first time, a first state corresponding to at least one of the mobile payment application executing on the mobile device associated with the user or the mobile device associated with the user;
    receiving, at a second time by the processor of the PPS and from a mobile payment application associated with a recipient of the payment instrument executing on a mobile device associated with the recipient, a representation of the payment instrument including a captured signature, wherein the representation is obtained by a sensor of the mobile device associated with the recipient;
    obtaining, by the processor of the PPS at or near the second time, a second state corresponding to at least one of the mobile payment application associated with the recipient or the mobile device associated with the recipient;
    identifying, by the processor of the PPS, the user associated with the payment instrument;
    comparing, by the processor of the PPS, by the processor of the PPS, the captured signature included in the representation with the signature stored in association with the payment instrument corresponding to the user;
    comparing the first state with the second state;
    upon determining that the captured signature included in the representation substantially matches the signature stored in association with the payment instrument corresponding to the user and that the first state substantially matches the second state, activating, by the processor of the PPS, the payment instrument; and
    upon determining that the captured signature included in the representation does not substantially match the signature stored in association with the payment instrument corresponding to the user or that the first state does not substantially match the second state, notifying, by the processor of the PPS, the recipient that the payment instrument has not been activated.

6. The method of claim 5, further comprising:
    providing, by the processor of the PPS, an engagement option on a user interface of the mobile payment application executing on the mobile device associated with the user, wherein the mobile payment application is communicatively connected to the PPS;
    detecting, by the processor of the PPS and in response to an interaction of the user with the engagement option, an indication that the user has submitted the signature stored in association with the payment instrument; and
    receiving, from the mobile payment application associated with the recipient and by the processor of the PPS, a request to cause a physical delivery of the payment instrument to a delivery location, wherein the payment instrument includes a pattern that substantially corresponds to at least one of the signature stored in association with the payment instrument or metadata corresponding to characteristics of at least one of the mobile device associated with the user or the mobile payment application executing on the mobile device associated with the user.

7. The method of claim 6, the method comprising:
    receiving, by the processor of the PPS, a notification indicating that the pattern has been included in the payment instrument, wherein the pattern is one of embedded, embossed, printed or engraved on the payment instrument;
    causing, by the processor of the PPS, the payment instrument having the pattern to be delivered to the delivery location; and
    receiving, by the processor of the PPS and from a third-party system, another notification that indicates successful delivery of the payment instrument to the delivery location.

8. The method of claim 6, further comprising:
    receiving, by the processor of the PPS, an indication of an intent of the recipient to activate a payment instrument; and
    generating, by the processor of the PPS on the user interface of the mobile payment application associated with the recipient, a set of instructions for the recipient instructing the recipient to capture the representation.

9. The method of claim 8, wherein obtaining the first state and the second state includes:

detecting a list of available communication ports of the mobile device;

selecting, by the processor of the PPS, a communication port from amongst the available communication ports for communicating with the mobile device;

establishing one or more communication channels between one or more components within the PPS and one or more components within the mobile device through the selected communication port;

obtaining, by individual components of the plurality of components, at least one device characteristic corresponding to the mobile device, wherein the at least one device characteristic comprises at least one of timing parameters, radiated performance, wireless performance, quality of communication links, radio frequency response, transmission measurements, receiver measurements, or engineering tolerances; and obtaining, by the processor of the PPS, at least one of the first state or the second state corresponding to the mobile device based at least in part on the at least one device characteristic.

10. The method of claim 8, wherein the at least one of the first state or the second state includes at least one of: radio, mechanical or operational fingerprints, radiated performance, device defects, sensor performance, communication speed, communication lags, spectrum data, location of the buyer, location of the transaction, time of the transaction, payment instrument information, open communication ports, settings of one or more software applications, a number of applications running on the devices, memory usage, virus identification, or error logs.

11. The method of claim 6, further comprising:

receiving, by the processor of the PPS, an indication of an intent of the recipient to activate the payment instrument;

generating, on the interface of the mobile payment application associated with the recipient, a set of instructions for the recipient instructing the recipient to capture the representation;

tracking, by the processor of the PPS, a geographical location of the recipient, the payment instrument, or the representation;

comparing, by the processor of the PPS, the delivery location with the geographical location of the recipient, the payment instrument, or the representation;

determining, by the processor of the PPS, that the comparison does not yield a match; and notifying, by the processor of the PPS, the user using a communication identifier associated with the user that a possible fraudulent attempt is being made to activate the payment instrument.

12. The method of claim 5, wherein at least one of the signature stored in association with the payment instrument or the captured signature comprises at least one of a digital image, a scanned picture, a picture, an alphanumeric value, a shape, a bar code, a QR code, an RFID tag, or a color.

13. The method of claim 5, further comprising:

determining an account of the user is associated with usage restrictions; and crediting the payment instrument with a certain value as per the usage restrictions.

14. The method of claim 5, wherein causing the signature to be stored in association with the payment instrument corresponding to the user includes encrypting the signature.

15. A payment processing system (PPS) for activating a payment instrument, the PPS comprising:

a processor configured to execute instructions to:

receive, from a mobile payment application executing on a mobile device of a user and at a first time, a feature submitted by the user, wherein the feature is to be associated with a payment instrument;

obtain, at or near the first time, a first state corresponding to at least one of the mobile payment application executing on a mobile device of the user or the mobile device;

receive, at a second time, a representation of a captured feature associated with a payment instrument, wherein the representation is obtained by a sensor of a mobile device associated with a recipient of the payment instrument;

obtain, at or near the second time, a second state corresponding to at least one of a mobile payment application executing on a mobile device associated with the recipient or the mobile device associated with the recipient; and compare the first state and the second state;

compare the representation of the captured feature with the feature submitted by the user;

upon determining that the representation is substantially similar to the feature submitted by the user and that the first state is within a threshold value of the second state, activate the payment instrument; and upon determining that at least one of (i) the representation is not substantially similar to the feature submitted by the user or (ii) the first state differs from the second state by the threshold value, notify the user using a communication identifier associated with the user that a possible fraudulent attempt is being made to activate the payment instrument.

16. The PPS of claim 15, wherein at least one of the feature submitted by the user or the captured feature comprises at least one of a picture, an alphanumeric value, a shape, a bar code, a QR code, an RFID tag, or a color.

17. The PPS of claim 15, wherein the at least one of the first state or second state includes at least one of: radio, mechanical or operational fingerprints, radiated performance, device defects, sensor performance, communication speed, communication lags, spectrum data, location of the buyer, location of the transaction, time of the transaction, payment instrument information, open communication ports, settings of one or more software applications, a number of applications running on the devices, memory usage, virus identification, or error logs.

18. The PPS of claim 15, further comprising a location tracker configured to:

track a geographical location of at least one of the recipient, the payment instrument, or the representation of the captured feature, wherein the representation of the captured feature comprises a geo-tagged digital image;

compare the geographical location of the at least one of the recipient, the payment instrument or the representation of the captured feature with a delivery location where the user requests delivery of the payment instrument;

determine whether the comparison yields a match;

upon determining that the comparison yields a match, activate the payment instrument; and upon determining that the comparison does not yield a match, notify the user using the communication identifier associated with the user that a possible fraudulent attempt is being made to activate the payment instrument.

19. The PPS of claim 15, wherein activating includes granting, by the PPS and to the recipient, access to a predetermined amount of funds through the activated payment instrument.

20. One or more non-transitory computer-readable media maintaining instructions that, when executed by one or more processors of a payment processing system (PPS), program the one or more processors to:
- receive, at a first time and from the mobile device associated with a user, an activation feature submitted by the user to associate with the user and with a payment instrument;
- obtain, via a state machine of the PPS and at or near the first time, a first state corresponding to at least one of a mobile device associated with the user or a mobile payment application executing on the mobile device associated with the user;
- receive, at a second time an image of captured activation feature associated with the payment instrument, wherein the image is obtained by a sensor of a mobile device associated with a recipient of the payment instrument;
- obtain, via a state machine of the PPS and at or near the second time, a second state corresponding to at least one of the mobile device associated with the recipient or a mobile payment application executing on the mobile device associated with the recipient;
- compare the image of the captured activation feature with the activation feature submitted by the user;
- compare the first state and the second state;
- upon determining that the image substantially matches the activation feature submitted by the user or that the first state differs from the second state by less than a threshold value, activate the payment instrument, wherein activating includes granting the recipient access to a predetermined amount of funds through the payment instrument; and
- upon determining that the image does not substantially match the activation feature submitted by the user or that the first state differs from the second state by at least the threshold value, generate an alternate path of activating the payment instrument.

* * * * *